(12) United States Patent  
McMurtry et al.

(10) Patent No.: US 11,123,924 B2
(45) Date of Patent: Sep. 21, 2021

(54) POWDER BED FUSION APPARATUS AND METHODS

(71) Applicant: RENISHAW PLC, Wotton-under-Edge (GB)

(72) Inventors: David Roberts McMurtry, Stancombe (GB); Christopher Sutcliffe, Liverpool (GB); Robin Geoffrey Weston, Alsager (GB); Paul Campton, Cheltenham (GB); David John Whitton, Bristol (GB); David Beeby, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 103 days.

(21) Appl. No.: 16/483,263

(22) PCT Filed: Feb. 20, 2018

(86) PCT No.: PCT/GB2018/050435
§ 371 (c)(1),
(2) Date: Aug. 2, 2019

(87) PCT Pub. No.: WO2018/154283
PCT Pub. Date: Aug. 30, 2018

(65) Prior Publication Data
US 2020/0016838 A1 Jan. 16, 2020

(30) Foreign Application Priority Data

Feb. 21, 2017 (GB) .................................. 1702800
Feb. 21, 2017 (GB) .................................. 1702801
Oct. 6, 2017 (EP) .................................. 17195111

(51) Int. Cl.
*B29C 64/241* (2017.01)
*B29C 64/321* (2017.01)
(Continued)

(52) U.S. Cl.
CPC .......... *B29C 64/241* (2017.08); *B29C 64/205* (2017.08); *B29C 64/245* (2017.08);
(Continued)

(58) Field of Classification Search
CPC ... B29C 64/241; B29C 64/321; B29C 64/245; B29C 64/268; B29C 64/205;
(Continued)

(56) References Cited

U.S. PATENT DOCUMENTS 5,569,431 A 10/1996 Hull
5,753,274 A 5/1998 Wilkening et al.
(Continued)

FOREIGN PATENT DOCUMENTS

DE 3010964 A1 11/1980
DE 3937199 A1 5/1991
(Continued)

OTHER PUBLICATIONS

Jun. 11, 2018 International Search Report issued in International Patent Application No. PCT/GB2018/050435.
(Continued)

*Primary Examiner* — Joseph S Del Sole
*Assistant Examiner* — Lawrence D. Hohenbrink, Jr.
(74) *Attorney, Agent, or Firm* — Oliff PLC

(57) ABSTRACT

A powder bed fusion apparatus for building an object in a layer-by-layer manner includes a build platform movable within a build sleeve to define a build volume, a layer formation device for forming layers of powder across the build volume in a working plane and an irradiation device for irradiating powder in the working plane to selectively fuse the powder. The powder bed fusion apparatus further includes a mechanical manipulator arranged to engage with the object and/or a build substrate, to which the object is attached, to tilt the object in a raised position above the
(Continued)

working plane such that powder is freed from the object and deposited at a location above the working plane and/or into the build volume.

23 Claims, 22 Drawing Sheets

(51) Int. Cl.

| | |
|---|---|
| *B29C 64/245* | (2017.01) |
| *B29C 64/268* | (2017.01) |
| *B29C 64/205* | (2017.01) |
| *B29C 64/371* | (2017.01) |
| *B33Y 30/00* | (2015.01) |
| *B33Y 40/00* | (2020.01) |
| *B29C 64/153* | (2017.01) |
| *B22F 10/10* | (2021.01) |
| *B22F 10/70* | (2021.01) |
| *B22F 12/33* | (2021.01) |
| *B22F 12/80* | (2021.01) |
| *B22F 12/30* | (2021.01) |
| *B22F 10/28* | (2021.01) |
| *B22F 12/82* | (2021.01) |
| *B22F 12/37* | (2021.01) |
| *B22F 10/73* | (2021.01) |
| *B22F 12/88* | (2021.01) |

(52) U.S. Cl.
CPC .......... *B29C 64/268* (2017.08); *B29C 64/321* (2017.08); *B29C 64/371* (2017.08); *B22F 10/10* (2021.01); *B22F 10/28* (2021.01); *B22F 10/70* (2021.01); *B22F 10/73* (2021.01); *B22F 12/30* (2021.01); *B22F 12/33* (2021.01); *B22F 12/37* (2021.01); *B22F 12/80* (2021.01); *B22F 12/82* (2021.01); *B22F 12/88* (2021.01); *B29C 64/153* (2017.08); *B33Y 30/00* (2014.12); *B33Y 40/00* (2014.12)

(58) Field of Classification Search
CPC ..... B29C 64/371; B29C 64/153; B33Y 30/00; B33Y 40/00; B22F 10/00; B22F 10/28; B22F 10/70; B22F 10/73; B22F 10/30; B22F 10/33; B22F 10/37; B22F 10/80; B22F 10/82; B22F 10/88
USPC ........................................................ 425/472
See application file for complete search history.

(56) References Cited

U.S. PATENT DOCUMENTS

| | | | |
|---|---|---|---|
| 5,814,161 A | 9/1998 | Sachs et al. | |
| 5,855,149 A | 1/1999 | Islam et al. | |
| 6,042,774 A | 3/2000 | Wilkening et al. | |
| 8,267,683 B2 | 9/2012 | Inoue | |
| 10,052,821 B2 | 8/2018 | Rehme | |
| 2001/0045678 A1 | 11/2001 | Kubo et al. | |
| 2004/0025905 A1 | 2/2004 | Ederer et al. | |
| 2004/0045941 A1 | 3/2004 | Herzog et al. | |
| 2004/0084814 A1 | 5/2004 | Boyd et al. | |
| 2006/0022379 A1 | 2/2006 | Wicker et al. | |
| 2006/0192322 A1* | 8/2006 | Abe .................. B22F 10/00 |
| | | | 264/497 |
| 2007/0001342 A1 | 1/2007 | Oberhofer et al. | |
| 2007/0026145 A1 | 2/2007 | Lindemann et al. | |
| 2007/0077323 A1 | 4/2007 | Stonesmith et al. | |
| 2007/0126157 A1 | 6/2007 | Bredt | |
| 2008/0241404 A1 | 10/2008 | Allaman et al. | |
| 2015/0239177 A1 | 8/2015 | Heugel et al. | |
| 2016/0067923 A1 | 3/2016 | James et al. | |
| 2016/0200053 A1 | 7/2016 | Chen et al. | |
| 2016/0325358 A1 | 11/2016 | Nardi et al. | |
| 2017/0036401 A1* | 2/2017 | Donovan ................ B08B 7/028 |
| 2017/0120332 A1* | 5/2017 | DeMuth .................. B22F 10/00 |
| 2018/0236504 A1 | 8/2018 | Pourcher et al. | |

FOREIGN PATENT DOCUMENTS

| | | |
|---|---|---|
| DE | 10053741 C1 | 2/2002 |
| DE | 102007039035 B3 | 1/2009 |
| DE | 102008012063 A1 | 9/2009 |
| DE | 102008012064 A1 | 9/2009 |
| DE | 102008022495 A1 | 11/2009 |
| DE | 102011002954 A1 | 7/2012 |
| DE | 102011075748 A1 | 11/2012 |
| DE | 102011119338 A1 | 5/2013 |
| DE | 202016003042 U1 | 7/2016 |
| EP | 1620224 B1 | 9/2006 |
| EP | 1670607 B1 | 4/2008 |
| EP | 1793979 B1 | 2/2009 |
| EP | 2052845 A2 | 4/2009 |
| EP | 2596941 A1 | 5/2013 |
| GN | 104923788 A | 9/2015 |
| GN | 105170998 A | 12/2015 |
| JP | 4239652 B2 | 3/2009 |
| WO | 93/08928 A1 | 5/1993 |
| WO | 2004/004955 A1 | 1/2004 |
| WO | 2006/024373 A2 | 3/2006 |
| WO | 2007/064946 A2 | 6/2007 |
| WO | 2008/116627 A1 | 10/2008 |
| WO | 2010/007394 A1 | 1/2010 |
| WO | 2010/007396 A1 | 1/2010 |
| WO | 2010/026396 A2 | 3/2010 |
| WO | 2014/044589 A1 | 3/2014 |
| WO | 2015/071184 A1 | 5/2015 |
| WO | 2016/030530 A1 | 3/2016 |
| WO | 2017/017273 A1 | 2/2017 |
| WO | 2017/121995 A1 | 7/2017 |

OTHER PUBLICATIONS

Jun. 11, 2018 Written Opinion issued in International Patent Application No. PCT/GB2018/050435.
Nov. 10, 2017 Search Report issued in British Patent Application No. 1702801.0.
Mar. 14, 2018 Search Report and Written Opinion issued in European Patent Application No. 17195111.4.

* cited by examiner

POWDER BED FUSION APPARATUS AND METHODS

FIELD OF INVENTION

This invention concerns powder bed fusion apparatus and methods in which selected areas of a powder bed are solidified in a layer-by-layer manner to form a workpiece. The invention has particular, but not exclusive application, to selective laser melting (SLM) and selective laser sintering (SLS) apparatus.

BACKGROUND

Powder bed fusion apparatus produce objects through layer-by-layer solidification of a material, such as a metal powder material, using a high energy beam, such as a laser or electron beam. A powder layer is formed across a powder bed contained in a build sleeve by lowering a build platform to lower the powder bed, depositing a heap of powder adjacent to the lowered powder bed and spreading the heap of powder with a wiper across (from one side to another side of) the powder bed to form the layer. Portions of the powder layer corresponding to a cross-section of the workpiece to be formed are then solidified through irradiating these areas with the beam. The beam melts or sinters the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774.

A problem with such powder bed fusion apparatus is how to extract the workpiece from the powder bed after completion of the build. In particular, it is desirable to extract the workpiece and recover the unsolidified powder without exposing the unsolidified powder to an atmosphere having a high oxygen concentration, for example air, such that the recovered powder can be used for a subsequent build. It is known, for example, from EP1793979 to provide a glove box and suction nozzle to allow a user to separate the powder from the workpiece before the workpiece is removed from the powder bed fusion apparatus. A problem with such an apparatus is that it requires manual intervention through a glove box. It is desirable to provide an apparatus that can separate the workpiece from the powder without manual intervention through a glove box.

It is known from US2004/0084814 and US 2007/0026145 to provide one or more gas inlet(s) and gas outlet(s) to the build sleeve to provide a flow of gas through the build sleeve for forcing powder from the build sleeve.

US2008/0241404 describes apparatus comprising a build platform of the build sleeve having collapsible or removable parts capable of releasing unused powder directly from the build sleeve in a downward direction under the force of gravity. Such a system is particularly unsuitable for use with metal powder as a workpiece built from metal powder typically must be secured to a solid substrate plate, for example as described in U.S. Pat. No. 5,753,274.

Other systems separate the powder from the workpiece at a location different to that in which the workpiece is built. US2007/0001342 and WO2015/071184 disclose the removal of the build piston/container from the selective laser melting apparatus to a separate station in which the powder is separated from the workpiece. US2007/0001342 describes a station comprising a tilting device with which the removed build container is tilted so that raising of a carrier pushes powder over an overflow edge for collection. WO2015/071184 discloses a station in which the removed build container is rotated through an angle of at least 90 degrees from an upright position. In an alternative embodiment, the construction platform may be already inserted into the rotary frame during production of the object. The upright position from which the construction platform is rotated is that position of the construction platform in which the object has been produced.

DE102011002954 and US2001/0045678 discloses apparatus for transferring the workpiece and powder bed to a powder removal station. US2001/0045678 discloses transferring the workpiece to the powder removal station through an opening in the build sleeve. DE102011002954 discloses raising the build platform such that the workpiece is elevated above the build sleeve and then using a feed device for pushing the workpiece and powder cake into a filter device.

WO93/08928, US2015/0239177 A1 and WO2016/030530 A1 describe hat-like containers that are placed above the construction space, the containers open on a side facing the construction space. The manufactured object and non-solidified powder surrounding the object are displaced into the container from the construction space. In WO93/08928 and US2015/0239177 A1 the object and non-solidified powder are then removed from the device within the container. US2015/0239177 A1 describes that the element that serves as a base plate during layer-wise manufacturing is used as a closure element for closing the container. In WO2016/030530 A1, the base plate is a porous base plate and the container is linearly displaced to move the porous base plate above a funnel shaped collecting container such that the powder surrounding the object falls from the hat-like container into the collecting container.

A problem with such devices is that the unsolidified powder is either removed from the powder bed fusion apparatus or the unsolidified powder is freed from the object and deposited away from the conventional powder handling apparatus (dosing piston or powder overflow). Accordingly, for such a system there is a need to provide additional powder handling and/or transport devices to recover the unsolidified powder for use in a subsequent build.

US2007/0126157 A1 discloses apparatus for recovering the powder into the build piston. The apparatus comprises ejector pins located in the build piston for pushing or pulling the part within the build piston to move a portion of the unbound powder away from the manufactured article. To provide space for the unbound powder to move, the build platform is lowered further. This requires a stroke of the build piston that is greater than the full build height. Furthermore, powder can still remain trapped within the manufactured article.

SUMMARY OF INVENTION

According to a first aspect of the invention there is provided a powder bed fusion apparatus for building an object in a layer-by-layer manner, the powder bed fusion apparatus comprising a build platform movable within a build sleeve to define a build volume, a layer formation device for forming layers of powder across the build volume in a working plane, an irradiation device for irradiating powder in the working plane to selectively fuse the powder and a mechanical manipulator arranged to engage with the object and/or a build substrate, to which the object is attached, to tilt the object in a raised position above the working plane such that powder is freed from the object and deposited at a location above the working plane and/or into the build volume.

In this way, the freed powder can be recovered into the powder handling devices that are used in the build process, such as into a dosing piston used for dosing powder to be spread by a wiper in the formation of a layer or into a powder overflow channel that is used to collect excess powder at the end of layer formation. The powder may be deposited into such devices directly or may be transported into such devices using the build platform and/or a wiper used during the formation of the layers. In this way, additional complexity is avoided and a footprint of the powder bed fusion and powder recovery apparatus can be reduced compared to the prior art devices.

It will be understood that the "mechanical manipulator" is intended to be limited to a mechanical device, i.e. a machine or machinery, but not necessarily to a motorised and/or automated device. However, in a preferred embodiment, the mechanical manipulator is motorised such that at least a proportion of the operations carried out by the mechanical manipulator are/can be automated. Alternatively, the mechanical manipulator may be operated through a manually applied force. For example, an external actuating rod or lever may be provided, wherein manual manipulation of the actuating rod or lever operates the mechanical manipulator.

The mechanical manipulator may be arranged to engage with the build substrate supported on the build platform and on which the object is built and attached, the mechanical manipulator arranged to tilt the object by virtue of tilting the build substrate. The mechanical manipulator may be arranged such that, when engaged with the object and/or build substrate, the object can be picked-up clear from the build platform. The object may comprise any feature built during the additive build process, such as a part or workpiece, one or more supports and/or anchors attaching the part or workpiece to the build substrate and/or a feature separate from the part or workpiece, for example an engagement feature specifically built for engaging with the mechanical manipulator. The engagement feature may be built as an extension to the part/workpiece or may be built on the build substrate separate from the part/workpiece.

Unlike the typical build substrates, as disclosed in U.S. Pat. No. 5,753,274, during the build, the build substrate may not be secured to the build platform, for example by bolts or the like. In this way, the mechanical manipulator can engage with the build substrate for tilting of the build substrate without requiring an operation to free the build substrate from the build platform.

Alternatively, the build platform and build substrate may be arranged such that the build substrate can be releasably secured to the build platform such that, when the object and/or build substrate is engaged by the mechanical manipulator, the build substrate to which the object is attached can be released from the build platform for titling of the object without requiring manual access to the build substrate. For example, the build substrate and/or build platform may comprise an actuating mechanism for releasing a locking element that locks the build substrate to the build platform. The mechanical manipulator may comprise the actuating mechanism. Releasing of the build substrate from the build platform may be carried out automatically using a drive mechanism, such as a motor or an electromagnet.

The mechanical manipulator may be arranged to invert the object, for example by tilting the object by more than 90 degrees from an as built orientation of the object and preferably, by 180 degrees. In this way, powder that may be otherwise trapped in the object may be freed. The mechanical manipulator may be arranged to rotate the object about two, preferably orthogonal, axes. Both axes may be non-orthogonal to the working plane. Alternatively, a first one of the axes may be non-orthogonal to the working plane and a second one of the axes substantially orthogonal to the working plane. The mechanical manipulator may be operable to tilt the object about the first axis when the mechanical manipulator is in at least two orientations about the second axis such that the object can be tilted about the first axis with the object in different positions relative to the first axis. This may help to free powder form internal channels/recesses in the object.

The mechanical manipulator may be mounted in the apparatus such that the build platform has to be lowered from an engagement position in which the mechanical manipulator engages with the object and/or build substrate to provide room for rotation of the mechanical manipulator engaged with the object and/or build substrate. For example, the build platform may be raised up the build sleeve to the engagement position, such as to a top of the build sleeve, to cause engagement of the object and/or build substrate with the mechanical manipulator and then lowered back down the build sleeve to provide room for rotation of the mechanical manipulator engaged with the object and/or build substrate. This may allow rotatable elements of the mechanical manipulator to be mounted for rotation about a fixed axis (e.g. fixed relative to the build sleeve) rather than having to move the axis away from the build sleeve/build platform to provide sufficient clearance for rotation.

The powder bed fusion apparatus may comprise a build chamber for maintaining an inert atmosphere surrounding the object during the build, wherein the mechanical manipulator is arranged to tilt the object within the build chamber such that powder can be freed from the object whilst under the inert atmosphere. This may be advantageous as oxidisation of the powder can result in undesirable effects, such as fires and explosions and undesired properties of objects built in subsequent builds using the oxidised powder. By freeing the powder from the object whilst under the inert atmosphere oxidisation of the freed powder is avoided.

The mechanical manipulator may comprise a drive mechanism that extends outside of the build chamber, wherein application of a force to the drive mechanism operates the mechanical manipulator. The drive mechanism may be manually operable or driven by a motor.

Alternatively, the mechanical manipulator may be driven by an actuator, such as a motor, housed within the build chamber.

The mechanical manipulator may be arranged to remove the object from the build chamber. The mechanical manipulator may be mounted on a door of the build chamber, wherein opening of the door moves the mechanical manipulator and an object retained by the mechanical manipulator from the build chamber.

Alternatively, the mechanical manipulator may be mounted on a drive mechanism for withdrawing the mechanical manipulator and the retained object through a closable exit aperture in the build chamber. The closable exit aperture may be located in a ceiling of the build chamber.

The powder bed fusion apparatus may comprise a transfer chamber, wherein the mechanical manipulator comprises a drive mechanism arranged for moving the object to the transfer chamber. The mechanical manipulator may be located within the transfer chamber, the drive mechanism arranged for withdrawing the mechanical manipulator and the retained object through a closable exit aperture into the transfer chamber, wherein the object can be removed from the transfer chamber when the exit aperture is closed. The transfer chamber may be movable relative to the exit aperture, wherein movement of the transfer chamber closes the exit aperture. The irradiation device may comprise a scanner for directing a radiation beam to selected locations in the working plane, wherein the scanner is movable together with the transfer chamber such that the scanner closes the exit aperture when the transfer chamber moves away from the exit aperture.

The transfer chamber may be an airlock chamber, wherein the object can be removed from the build chamber through the transfer chamber whilst retaining the inert atmosphere in the build chamber.

The powder bed fusion apparatus may comprise a storage location outside of the build chamber and the mechanical manipulator may be arranged to, preferably automatically, deposit the object in the storage location. In this way, the mechanical manipulator is free to process a subsequent object built in the powder bed fusion apparatus without manual intervention. The mechanical manipulator may be arranged to, preferably automatically, pick-up a build substrate from the storage area for use in a subsequent build.

The mechanical manipulator may comprise at least one movable effector for engaging with the build substrate and/or object.

The effector may be at least one movable arm positionable such that raising of the build platform is required for, and preferably, causes, the object and/or build substrate to be attached to the at least one arm, wherein subsequent movement of the at least one arm tilts the object. The arm and build substrate may comprise cooperating fastening elements that are engaged to attach the mechanical manipulator to the build substrate by raising of the build platform. The cooperating fastening elements may comprise passive or active fastening elements. For example, the fastening elements may comprise passive fastening elements in the form of a resilient element on one of the arm of the manipulator and the build substrate that is deflected by engagement of a flange on the other of the build substrate and the arm of the manipulator when the build platform is raised to cause the resilient element to grip the flange, thus attaching the mechanical manipulator to the build substrate. Active fastening elements may comprise fastening elements activated by a motor or an electromagnet.

The mechanical manipulator may comprise a sensor for detecting engagement of the cooperating fastening elements. The mechanical manipulator may comprise an indicator for confirming engagement of the cooperating fastening elements, for example the indicator may be responsive to detection of the engagement by the sensor.

The movable arm may be mounted for rotation about an axis that is not orthogonal to the working plane. The axis may be parallel with the working plane. In this way, movement of the arm tilts the object.

The mechanical manipulator may comprise at least one first arm and at least one second arm arranged such that one of the at least one first arm and the at least one second arm can retain a first build substrate bearing an object built in the powder bed fusion apparatus whilst the other one of the at least one first arm and the at least one second arm retains a second build substrate for a subsequent build. The at least one first arm and the at least one second arm may be mounted in a fixed relationship such that the object on the first build substrate can be tilted at the same time as locating the second substrate on the build platform. The mechanical manipulator may be arranged such that the second substrate can be released from the mechanical manipulator whilst the first substrate remains retained in the mechanical manipulator. In this way, the build substrate for the next build can be put in place in parallel with a break-out of the current build from the unsolidified powder.

The effector may comprise at least one finger movable under the control of an actuator to engage an underside of the build substrate to tilt the build substrate, wherein the actuator and the finger are provided in or on the build platform.

The mechanical manipulator may comprise a powder guide for guiding freed powder to a desired location when the object is tilted. The powder guide may comprise a chute or a funnel that is oriented when the mechanical manipulator tilts the object to guide the freed powder to the desired location. The powder guide may comprise a receptacle, such as a box-like section, for housing the object, the chute or funnel forming part of the receptacle. The receptacle may confine the freed powder such that the freed powder is delivered to an outlet of the chute or funnel. The receptacle may comprise a first opening of the chute or funnel and a second opening arranged such that the object and build substrate can be pushed into the receptacle through the second opening by the build platform. The second opening may be closed by the build substrate when the build substrate is pushed into the receptacle by the build platform.

The chute or funnel may be positionable when the object is titled by the mechanical manipulator to dispense freed powder into the build volume, into a powder overflow channel and/or into a doser, such as a dosing piston. In this way, the freed powder can be recovered for use in a subsequent build. The chute or funnel may be located in such a position when the object has been inverted.

The powder bed fusion apparatus may comprise a powder overflow channel and/or a dosing piston and a sieve, wherein the sieve located or locatable to sieve freed powder before it enters the powder overflow channel and/or the dosing piston. The sieve may be movable. The sieve may be movable from a sieving position in which the sieve sieves freed powder before it enters the dosing piston to a remote position such that powder raised above the working plane by operation of the dosing piston does not pass (back) through the sieve. The sieve may be movable from a sieving position in which the sieve sieves freed powder before it enters the powder overflow channel and/or dosing piston to a disposal position in which material captured by the sieve is deposited in a collection bin.

The mechanical manipulator may comprise a vibrator, such as an ultrasonic vibrator, for vibrating the object when the object is tilted.

According to a second aspect of the invention there is provided a break-out device for the break-out of an object from unsolidified powder, the object built in a layer-by-layer manner in a powder bed fusion apparatus comprising a build platform movable within a build sleeve to define a build volume, a layer formation device for forming layers of powder across the build volume in a working plane and an irradiation device for irradiating powder in the working plane to selectively fuse the powder, the break-out device comprising a mechanical manipulator arranged to be mounted in or on the powder bed fusion apparatus such that the mechanical manipulator can engage with the object and/or a build substrate on which the object is built to tilt the object when in a raised position above the working plane such that powder is freed from the object and deposited at a location above the working plane and/or into the build volume.

The break-out device may be capable of being retrofitted to a powder bed fusion apparatus. The break-out device may comprise a build chamber door for a powder bed fusion apparatus, wherein the mechanical manipulator is mounted to the door, the door mountable on a build chamber of the powder bed fusion apparatus such that opening of the door moves the mechanical manipulator and an object retained by the mechanical manipulator from the build chamber.

Alternatively, the break-out device may be capable of being detachably mounted in or on the powder bed fusion apparatus for break-out of the object. In the latter case, the break-out device may be detachable/removable from the powder bed fusion apparatus such that it can be used with one or more further powder bed fusion apparatus. As the break-out device is used for break-out of the object and not during the build, sharing of the break-out device may allow for optimisation of the utility of the break-out device.

The mechanical manipulator may comprise a drive mechanism arranged to extend outside of a build chamber of the powder bed fusion apparatus, wherein application of a force to the drive mechanism operates the mechanical manipulator. The drive mechanism may be manually operable or driven by a motor.

According to a third aspect of the invention there is provided a plurality of powder bed fusion apparatus, each of the powder bed fusion apparatus for building an object in a layer-by-layer manner and comprising a build platform movable within a build sleeve to define a build volume, a layer formation device for forming layers of powder across the build volume in a working plane and an irradiation device for irradiating powder in the working plane to selectively fuse the powder, the plurality of powder bed fusion apparatus further comprising a mechanical manipulator movable between the plurality of powder bed fusion apparatus such that, in each powder bed fusion apparatus, the mechanical manipulator is capable of engaging with the object and/or a build substrate, to which the object is attached, to tilt the object in a raised position above the working plane such that powder is freed from the object and deposited at a location above the working plane and/or into the build volume.

According to a fourth aspect of the invention there is provided a powder bed fusion apparatus for building an object in a layer-by-layer manner, the powder bed fusion apparatus comprising a build platform movable within a build sleeve to define a build volume, a layer formation device for forming layers of powder across the build volume in a working plane, an irradiation device for irradiating powder in the working plane to selectively fuse the powder, a build chamber for maintaining an inert atmosphere surrounding the working plane and a movable transfer chamber comprising an aperture, wherein the transfer chamber is movable from a first position in which the aperture is in communication with the build chamber to allow transfer of the object into the transfer chamber and a second position in which the object can be transferred from the transfer chamber through the aperture into an ambient atmosphere.

The transfer chamber may be slidable between the first and second positions. Alternatively or additionally, the transfer chamber may be rotatable between the first and second positions.

The powder bed fusion apparatus may comprise means for generating an inert atmosphere in the transfer chamber before bringing the aperture of the transfer chamber into communication with the build chamber.

An aperture may be provided in a ceiling of the build chamber wherein the object can be transferred through this aperture into the transfer chamber. The irradiation device may be movable and the irradiation device and the transfer chamber arranged such that either one of the transfer chamber and the irradiation device may be located at the aperture in the ceiling of the build chamber. The irradiation device and the transfer chamber may be movable together as a single module.

The apparatus may comprise a mechanical manipulator arranged to engage with the object and/or a build substrate to transfer the object to and/or from the powder transfer chamber. The mechanical manipulator may be retractable into the transfer chamber so as to be transported therein.

According to a fifth aspect of the invention there is provided a powder bed fusion apparatus for building an object in a layer-by-layer manner, the powder bed fusion apparatus comprising a build platform movable within a build sleeve to define a build volume, a dosing piston movable within a dosing sleeve for dosing powder, a wiper for spreading powder dosed from the dosing sleeve for forming layers of powder across the build volume in a working plane, an irradiation device for irradiating powder in the working plane to selectively fuse the powder and a sieve movable from a sieving position in which the sieve sieves freed powder before it enters the dosing piston to a remote position.

The remote position may be such that powder raised above the working plane by operation of the dosing piston does not pass (back) through the sieve. The remote position may be a disposal position in which material captured by the sieve is deposited into a collection bin.

According to a sixth aspect of the invention there is provided a break-out device for the break-out of an object from unsolidified powder, the object built in a layer-by-layer manner in a powder bed fusion apparatus comprising a build platform movable within a build sleeve to define a build volume, a layer formation device for forming layers of powder across the build volume in a working plane and an irradiation device for irradiating powder in the working plane to selectively fuse the powder, the break-out device comprising a mechanical manipulator comprising a frame having coupling members thereon for engaging with the object and/or a build substrate on which the object is built, the frame rotatable to tilt the object such that powder is freed from the object, the coupling members arranged such that raising of the build platform with the object and/or build substrate mounted thereon causes the coupling members to engage the object and/or build substrate.

The mechanical manipulator may be mountable in or on the powder bed fusion apparatus.

Alternatively, the mechanical manipulator may be mounted in or on a break-out module separate from the powder bed fusion apparatus, the breakout module comprising a space for receiving a removable build sleeve of a powder bed fusion apparatus, the coupling members positioned or positionable such that raising of the build platform, with the object and/or build substrate mounted thereon, when the build sleeve is received in the space within the break-out module causes the coupling members to engage the object and/or build substrate. Rotation of the frame within the break-out station may cause freed powder to fall back into the build sleeve. The build sleeve contained freed powder may then be returned to the powder bed fusion apparatus for a subsequent build. The build sleeve may be useable as a dosing piston in the subsequent build.

According to a seventh aspect of the invention there is provided a powder bed fusion system comprising:—
 a powder bed fusion apparatus for building an object in a layer-by-layer manner, the powder bed fusion apparatus comprising a build chamber housing a build platform movable within a build sleeve to define a build volume, a layer formation device for forming layers of powder across the build volume in a working plane, an irradiation device for irradiating powder in the working plane to selectively fuse the powder, a build chamber aperture in the build chamber for the removal of the object rom the build chamber and a build chamber door for closing the aperture;

a transfer chamber having a transfer chamber aperture for receiving the object and a transfer chamber door for closing transfer chamber aperture, the transfer chamber arranged to be detachably mountable to the powder bed fusion apparatus to register the transfer chamber aperture with the build chamber aperture; and a transfer device located in the powder bed fusion apparatus or the transfer chamber and arranged to engage with the object and/or a build substrate, to which the object is attached, to transfer the object in a raised position above the working plane from the build chamber into the transfer chamber.

In this way, the object can be transferred from the powder bed fusion apparatus to a location for further processing within the transfer chamber in an inert atmosphere and/or such that powder remaining on the object is contained within the transfer chamber. By transferring the object in a raised position above the working plane from the build chamber into the transfer chamber, a majority of the powder will remain within the powder bed fusion apparatus. The transfer chamber may be detachably mountable to the powder bed fusion apparatus to seal an interface between the transfer chamber and the powder bed fusion apparatus to leakage of powder and/or inert gas therefrom.

The transfer chamber door may seal the transfer chamber aperture such that an inert atmosphere can be maintained within the transfer chamber. The transfer chamber may comprise means to form an inert gas atmosphere therein before opening the transfer chamber to the atmosphere within the build chamber. For example, the transfer chamber may comprise a gas circuit detachably connectable to a gas circuit on the powder bed fusion apparatus such that inert gas can be supplied to the transfer chamber from the powder bed fusion apparatus. Alternatively, the transfer chamber may comprise its own supply of an inert gas.

The transfer device may comprise a mechanical manipulator of the first aspect of the invention which can be displaced from a first position within the build chamber to a second position within the transfer chamber to transfer the object therebetween. The transfer device may comprise telescopic arms for moving the mechanical manipulator between the two positions.

Alternatively, the transfer device may comprise a device separate from a mechanical manipulator in the powder bed fusion apparatus for freeing powder form the object, such as described with reference to the first aspect of the invention, the transfer device arranged to take the object from the mechanical manipulator and transfer the object into the transfer chamber.

The transfer chamber may comprise a trolley for moving the transfer chamber about a factory floor. The transfer chamber may comprise handles such that the transfer chamber can be manually pushed about the factory floor.

DESCRIPTION OF EMBODIMENTS

Figure 1:
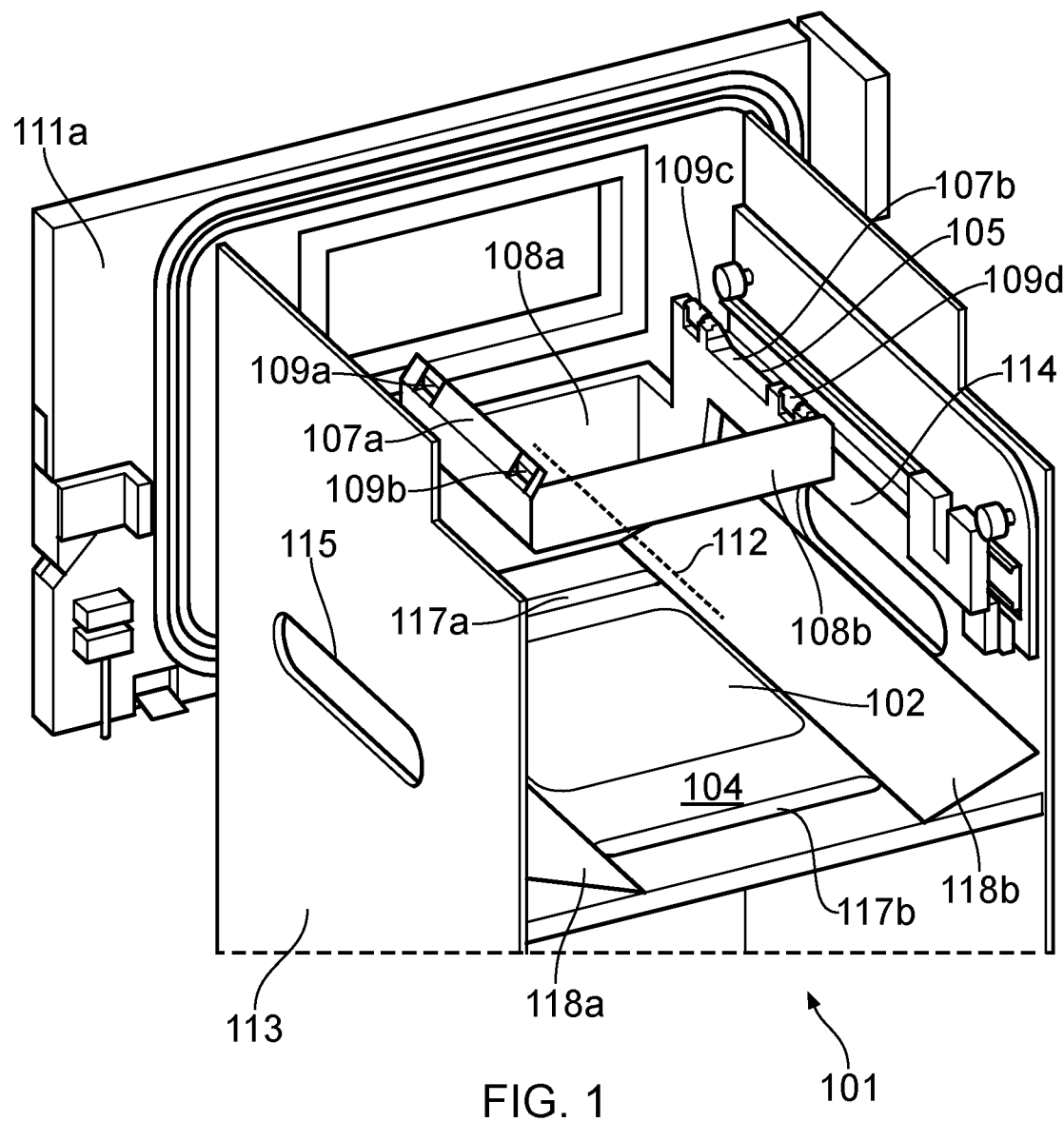
FIG. 1 is a perspective view of part of a powder bed fusion apparatus according to a first embodiment of the invention, wherein a mechanical manipulator is in a position such that layers of powder can be solidified.

Referring to FIGS. 1 to 6, a powder bed fusion apparatus 101 according to one embodiment of the invention comprises a build platform 102 movable within a build sleeve 103 to define a build volume, a layer formation device (not shown) for forming layers of powder across the build volume in a working plane and an irradiation device (not shown) for irradiating powder in the working plane to selectively fuse the powder. Successive formation of powder layers forms a powder bed in the build volume. The powder formation device typically comprises a doser (not shown) for dosing powder and a wiper (not shown) for spreading the dosed powder into a layer. In this embodiment, the doser is a top-doser, which doses powder onto surface 104.

A build chamber 113 is provided for maintaining an inert atmosphere surrounding the working surface of the powder bed. The build chamber 113 may comprise an upper and lower chamber as described in WO2010/007394. Doors 111a and 111b provide access to each of the upper and lower chambers of the build chamber, respectively. Gas flow inlet 114 and gas outlet 115 are provided for generating an inert gas flow across the working plane.

The doser may be in accordance with that disclosed in WO2010/007396. A lower edge of the wiper defines the working plane and is substantially aligned with the surface 104. The surface comprises apertures 117a, 117b, which define channels for collecting powder. The channels 117a, 117b lead to a collection hopper mounted to the side of build chamber 113 via conduits 119a, 119b. Powder in the collection hopper can be reused in a subsequent build and may be returned to the top-doser using an appropriate powder transport mechanism. Sloping side elements, in this embodiment, in the form of wedge shaped elements 118a, 118b, are provided either side of the build volume. The wedge shaped elements 118a, 118b help to confine the powder to the area therebetween.

The powder bed fusion apparatus further comprises a mechanical manipulator 105 arranged to engage with a build substrate 106, to which the object is attached, to tilt the object in a raised position above the working plane such that powder is freed from the object and deposited at a location above the working plane and into the build volume.

The mechanical manipulator 105 comprises an effector comprising a rigid frame comprising two L-shaped arms 107a, 107b connected together by connecting members 108a, 108b. The frame surrounds an open space such that for at least one position of the effector, such as the position shown in FIG. 1, a laser beam of the irradiation unit can be directed to all parts of a surface of the powder bed without impinging on the frame. In this position, the effector also avoids interference with the gas flow generated across the working plane. The effector further comprises displaceable hook-shaped coupling members 109a to 109d that are biased towards the position shown in FIG. 3. The coupling members 109a to 109d are arranged to hook under flanges 110a, 110b on the build substrate 106. The effector is mounted to the door 111a via a spindle (not shown) such that the effector can rotate through 360 degrees about an axis 112. The spindle extends through the door 111a and extends outside of the build chamber, wherein application of a force to the spindle rotates the effector. In this embodiment, the spindle is driven by a motor (not shown) housed in motor housing 116. However, in an alternative embodiment, the spindle may be manually rotated, for example via a lever or a wheel.

In use, during the building of an object, the effector is positioned as shown in FIG. 1 and an object is built in the conventional manner layer-by-layer by repeatedly lowering the build platform 102, spreading a layer of powder across the build volume and solidifying selected parts of the layer using the irradiation device. After formation of a layer, any excess powder is pushed into collection channels 117a, 117b by the wiper. The object will typically comprise a part or workpiece to be built and supports or anchors, which attach the part or workpiece to the build substrate 106. However, it is also known to build the part or workpiece directly on the build substrate 106, for example as described in EP1521657.

Figure 2:
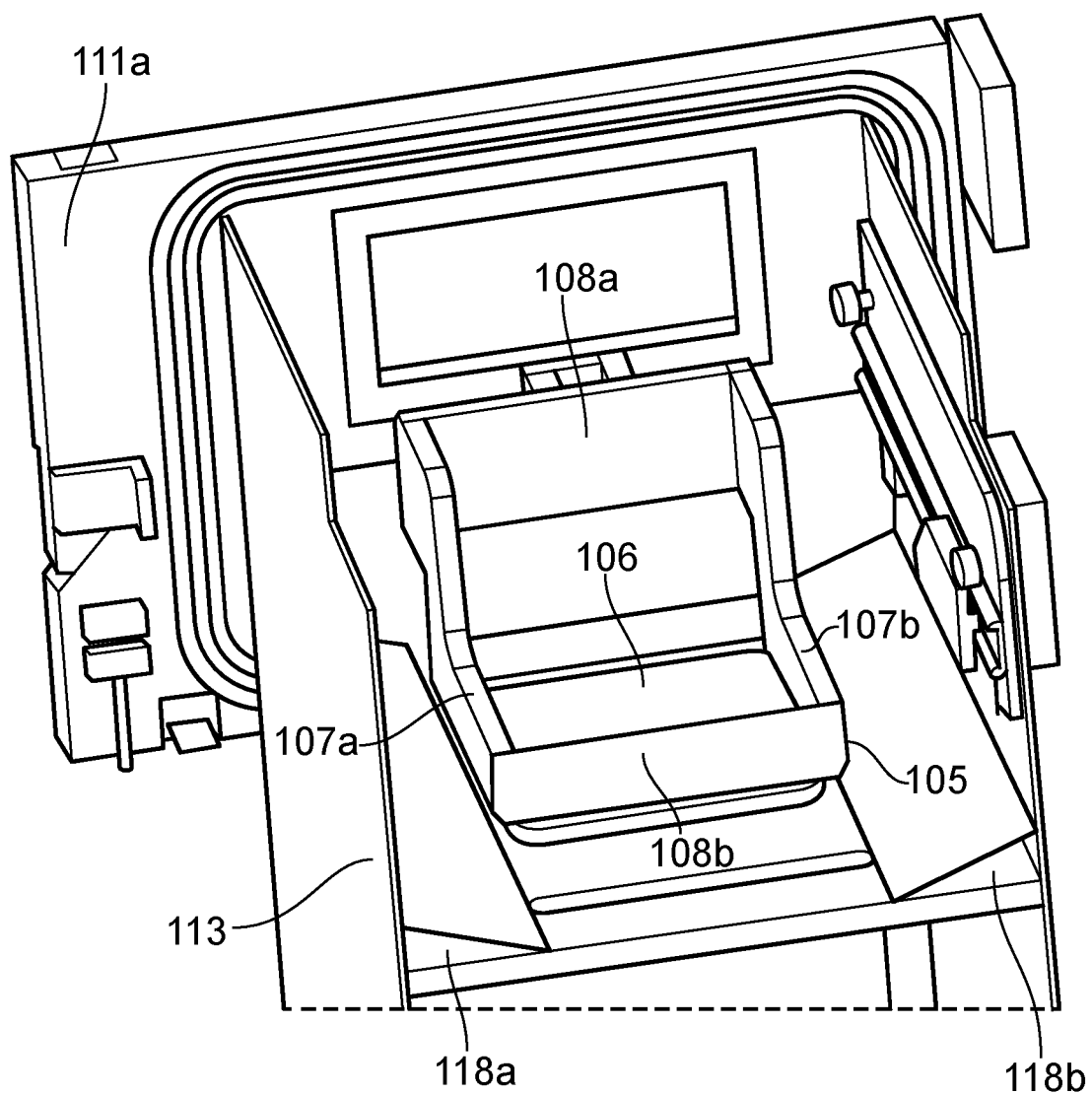
FIG. 2 is a perspective view of the powder bed fusion apparatus shown in FIG. 1 with the mechanical manipulator in a position for attaching to a build substrate on which an object (not shown) has been built.
Figure 3:
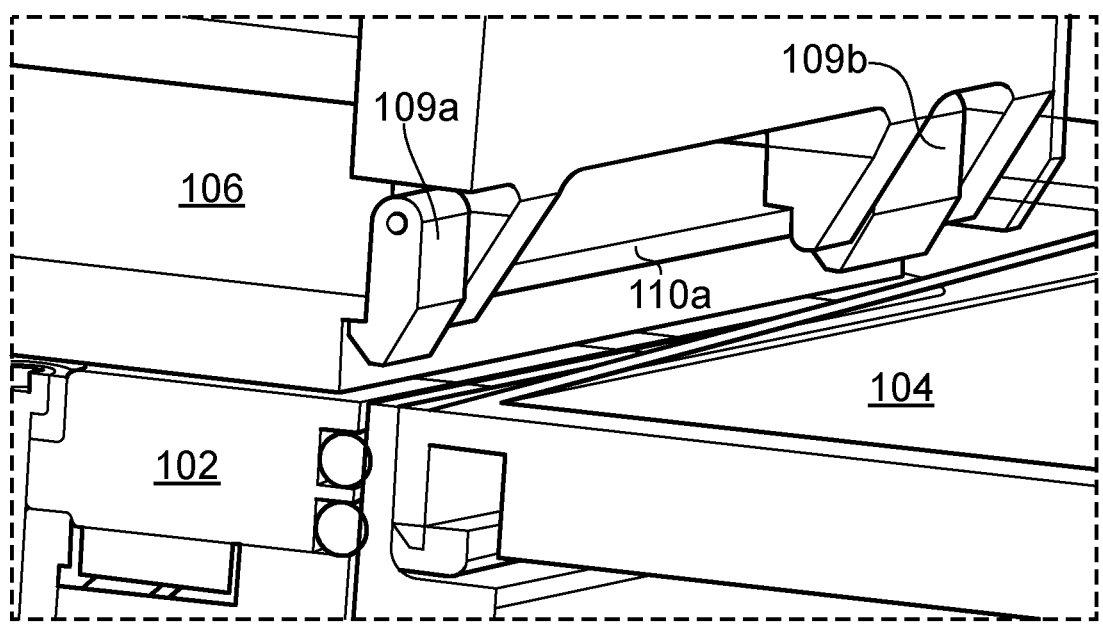
FIG. 3 is a perspective view of a flange on the build substrate and the connecting formations on the mechanical manipulator.

After the object has been completed, the effector is rotated to the position shown in FIGS. 2 and 3 with arms 107a, 107b and coupling members 109a to 109d located just above the surface 104 either side of the build volume. The build platform 102 is then raised such that flanges 110a, 110b on the build substrate 106 carrying the object engage with and deflect coupling members 109a to 109d with the coupling members returning under the biasing to the position shown in FIG. 3 once each flange 110a, 110b has moved past the hook shaped portions of the corresponding coupling members 109a to 109d. In this position, the build substrate 106 is retained by the effector.

With the build substrate 106 retained by the effector, the build platform 102 is lowered in the build sleeve 103. The effector is then rotated by the motor to a completely inverted position shown in FIG. 4 such that unsolidified powder is freed from the object and falls into the build volume and/or onto surface 104. An ultrasonic vibrator (not shown) may be provided on or embedded within the effector, vibration of the effector and therefore, the build substrate 106 helping to free unsolidified powder from the object.

Figure 5:
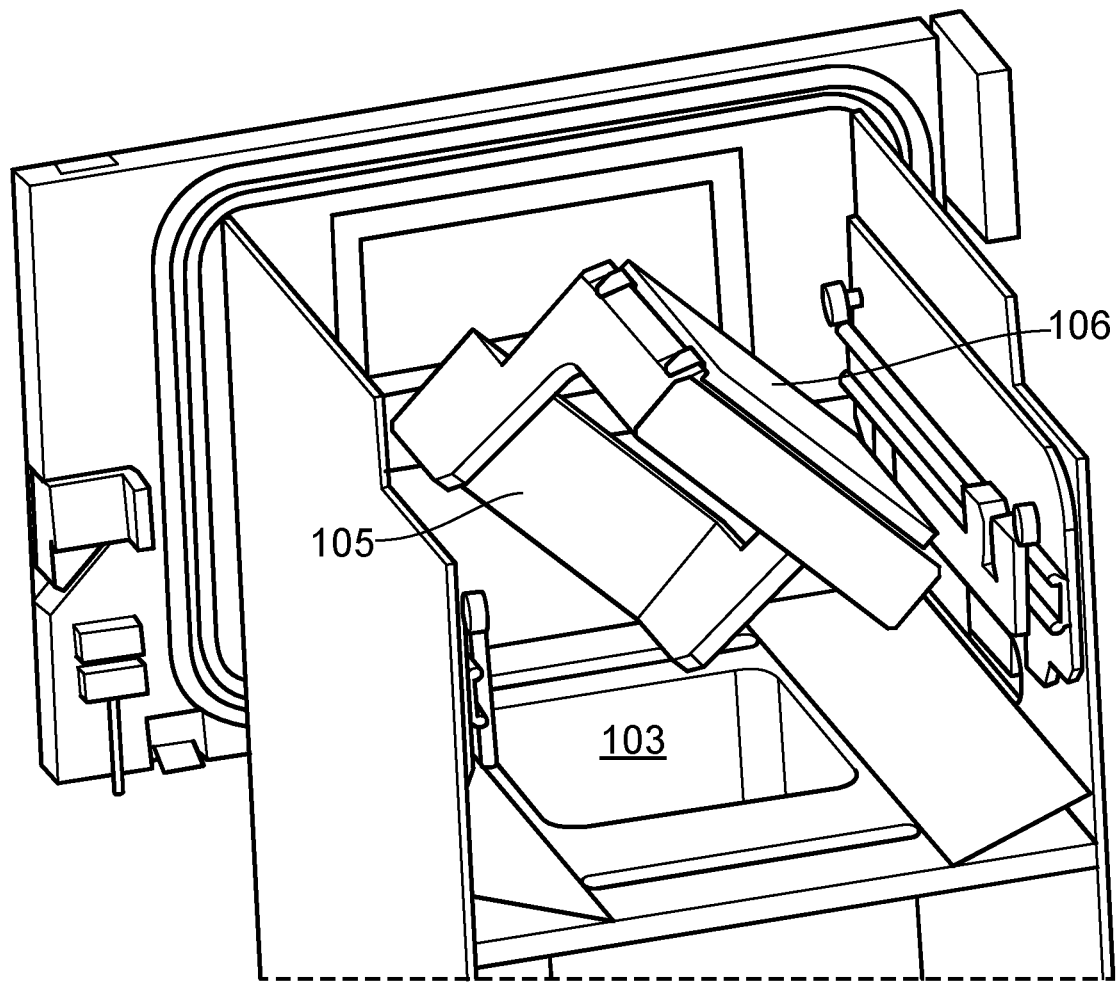
FIG. 5 is a perspective view of the mechanical manipulator in a position in which an object (not shown) attached to the build substrate is inverted by an angle between 90 and 180 degrees.
Figure 6:
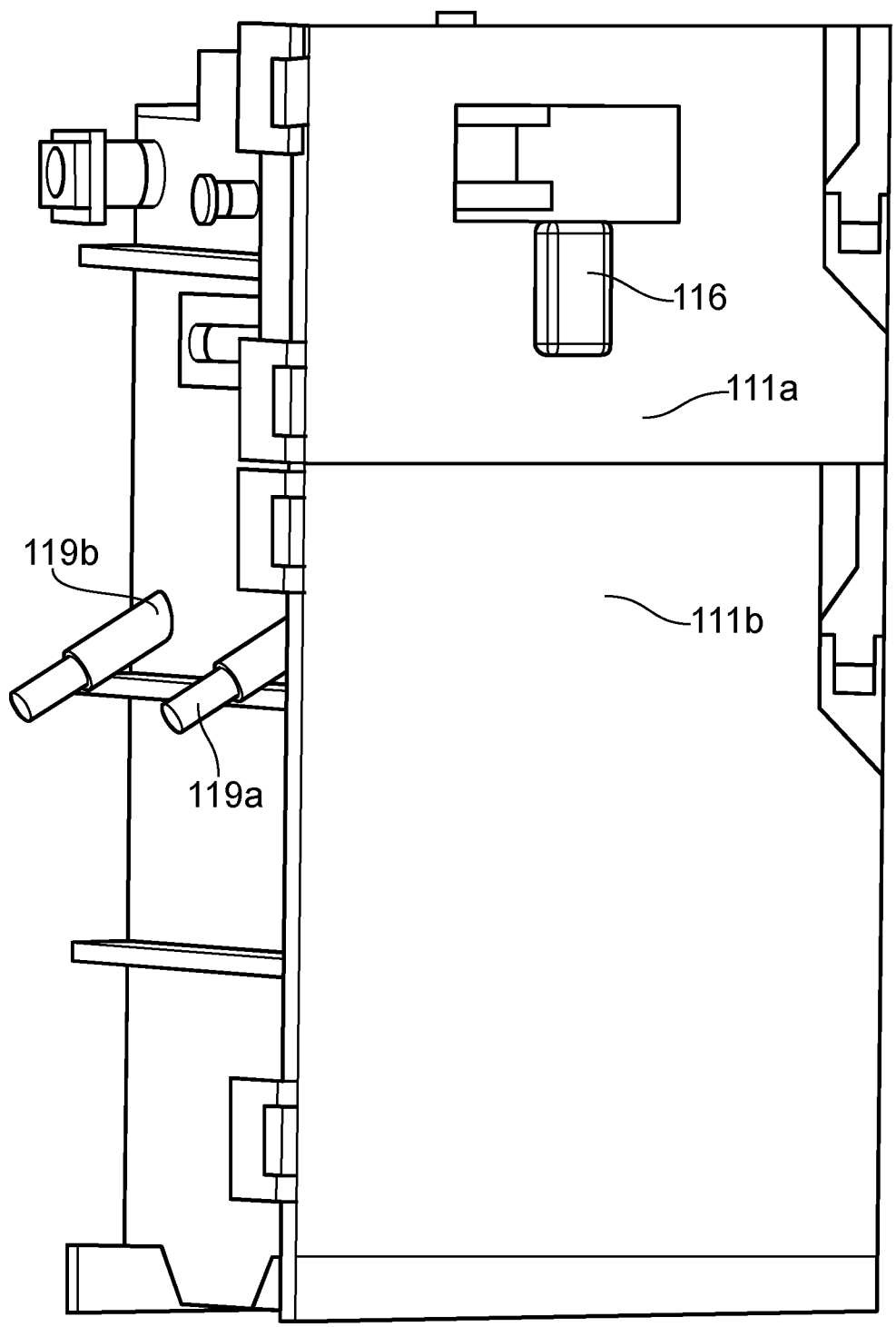
FIG. 6 is a perspective view of the powder bed fusion apparatus showing the outer doors to a build chamber.

To free unsolidified powder from internal tortuous channels within the object it may be necessary to rotate the object to a number of different orientations, with FIG. 5 showing one such position to which the effector can be rotated.

Figure 4:
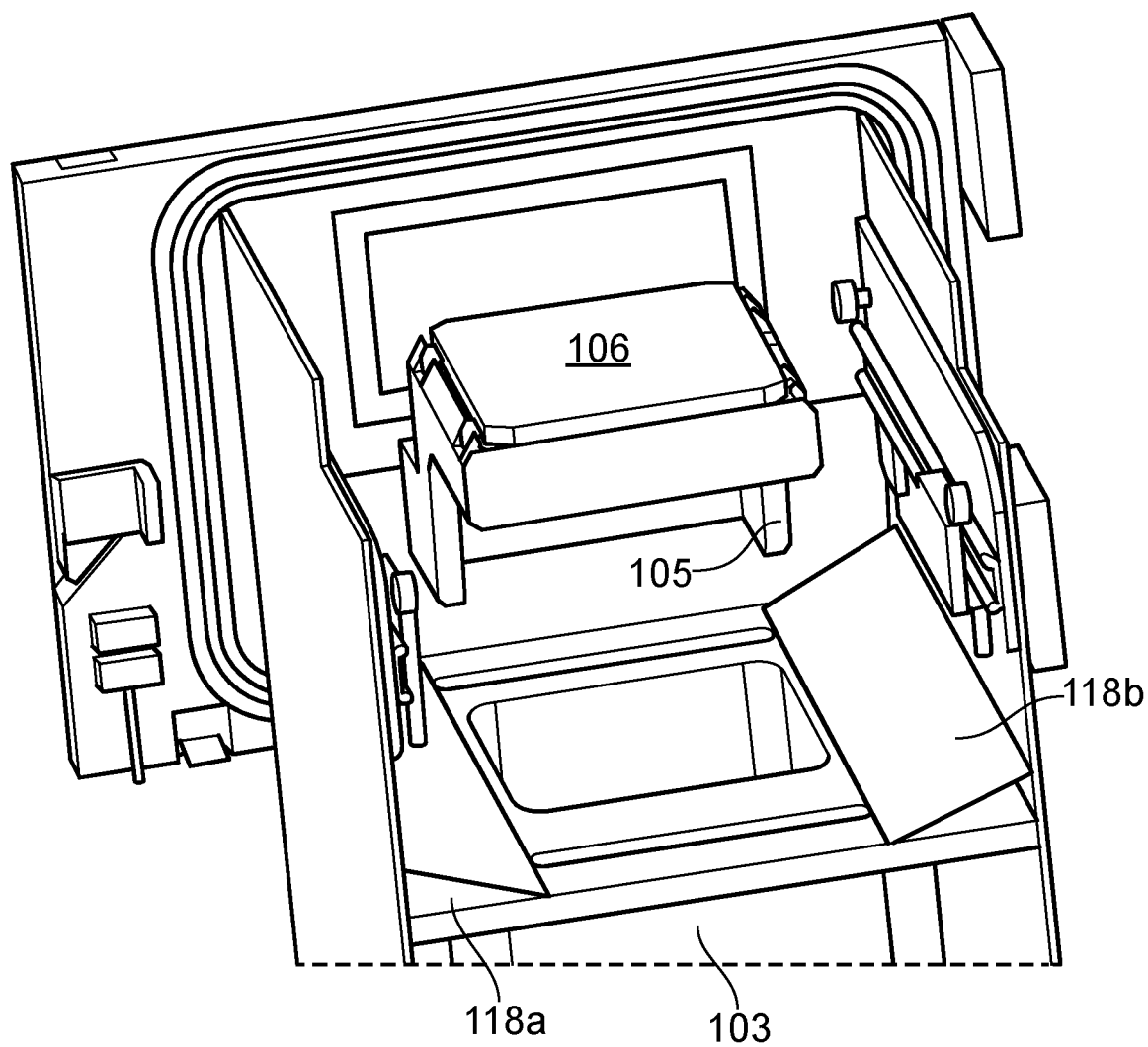
FIG. 4 is a perspective view of the mechanical manipulator in a position in which an object (not shown) attached to the build substrate is inverted by 180 degrees.

At the end of a powder removal step, the effector is returned to the position shown in FIG. 4. The build platform 102 is then raised to push the freed unsolidified powder above the working plane with the wiper pushing the freed unsolidified powder into collection channels 117a, 117b. Once the freed unsolidified powder has been recovered into channels 117a, 117b, the door 111a may be opened to extract the object and build substrate 106 from the powder bed fusion apparatus. The object leaves the build chamber by virtue of being attached to the mechanical manipulator, which is attached to the door 111a. The effector may be rotated to orient the object in its as built orientation for extraction, for example, for placing on a trolley for removal. A replacement build substrate can then be placed on the build platform 102 for the next build.

In an alteration to the above described embodiment, the mechanical manipulator may be mounted on a wall of the build chamber rather than door 111a.

FIGS. 7 through 10 show a powder bed fusion apparatus according to another embodiment of the invention. Features of this embodiment that are the same or similar to features of the embodiment described with reference to FIGS. 1 to 6 have been given the same reference numerals but in the series 200.

In this embodiment, the doser 220 comprises a dosing piston 220a movable in dosing sleeve 220b. Powder is dosed from the dosing sleeve 220b by upwards movement of the dosing piston 220a. A wiper 221 spreads the powder elevated to above the working plane across the build volume defined by build sleeve 203.

A ceiling 213a of the build chamber 213 comprises an aperture 222. The irradiation device, in this embodiment, an optical module 223, and mechanical manipulator 205 are slidably mounted on a guide rail above the build chamber 213 such that each of the irradiation device 223 and the mechanical manipulator 205 can be located above the aperture 222. When the irradiation device 223 is located above the aperture 222, the mechanical manipulator is located above a part and build substrate storage area 224. When the mechanical manipulator 205 is located above the aperture 222, the irradiation device is located in irradiation device storage area 225. The mechanical manipulator 205 and irradiation device 223 may be driven between these positions by a motor. Alignment mechanisms (not shown) may be provided for aligning the irradiation device 223 and mechanical manipulator 205 relative to the aperture 222, for example, a kinematic mount for locating the irradiation device 223 and mechanical manipulator 205 in repeatable positions. The irradiation device 223 may be calibrated for scanning the working plane for this repeatable position.

The mechanical manipulator 205 is housed in a transfer chamber 271. The transfer chamber 271 is movable from a position located above the aperture 222 to a position above the storage area 224. The transfer chamber 217 may form a seal with the ceiling wall such that objects can be transferred into the mechanical manipulator without compromising the inert atmosphere in the build chamber 213.

The mechanical manipulator comprises a box-like receptacle 207 having an opening 229 at one end that matches the size and shape of the build substrate 206 and, at the other end, a powder guide in the form of a funnel 232 for guiding freed powder to a smaller opening 226, which provides means for localising dispense of freed powder.

The box-like receptacle 207 is mounted for rotation on two extendible arms 227, 228. Extension of the arms moves the receptacle 207 from a raised position in the transfer chamber 271 above aperture 222 to a lowered position, in which the receptacle can engage with a build substrate 206 raised to a position above the working plane through movement of the build platform 202. The arms 227, 228 comprise telescopic arrangements such that the arms 227, 228 can be extended and retracted to move the receptacle 207 between the two positions. Like the embodiment shown in FIGS. 1 to 6, the receptacle may comprise coupling members/fingers thereon for engaging with a flange of the build substrate 206.

Figure 7:
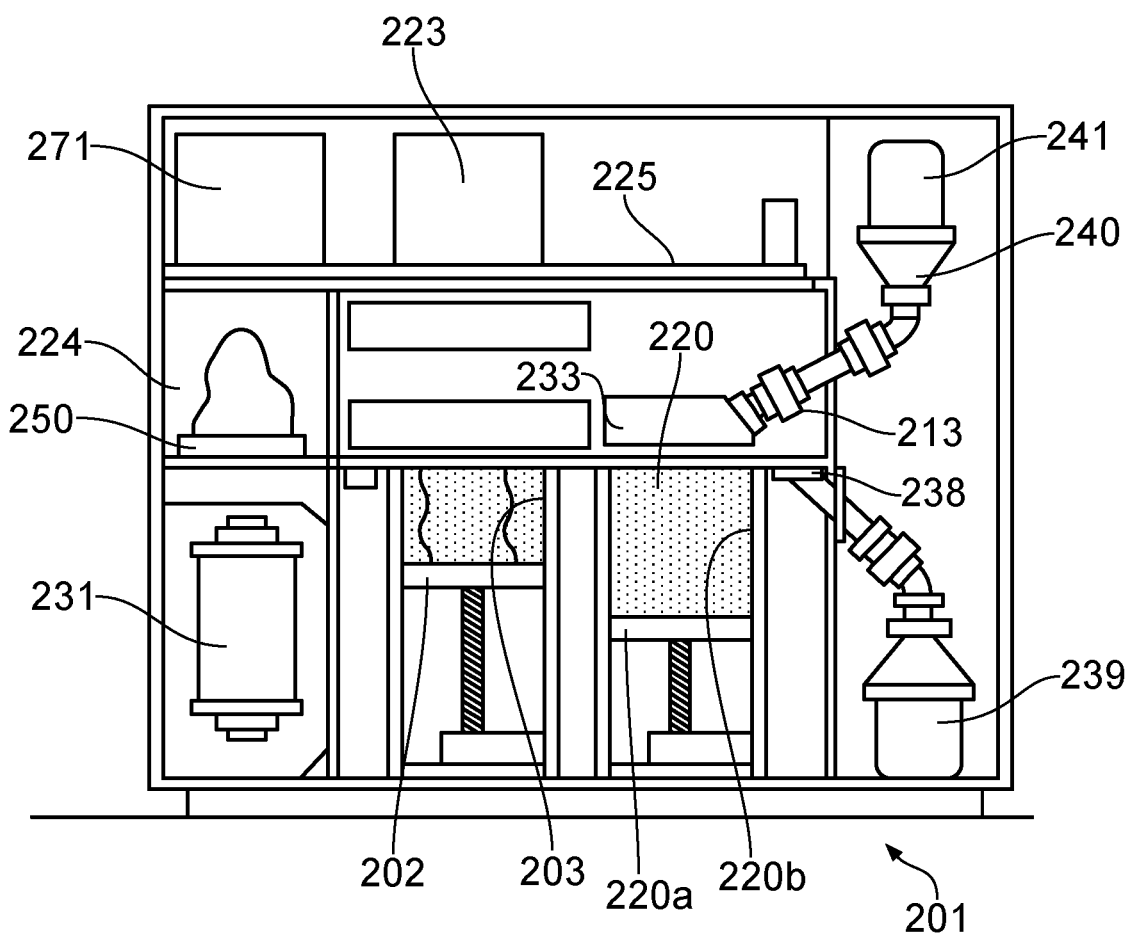
FIG. 7 is a schematic view of a powder bed fusion apparatus according to a second embodiment of the invention.
Figure 8:
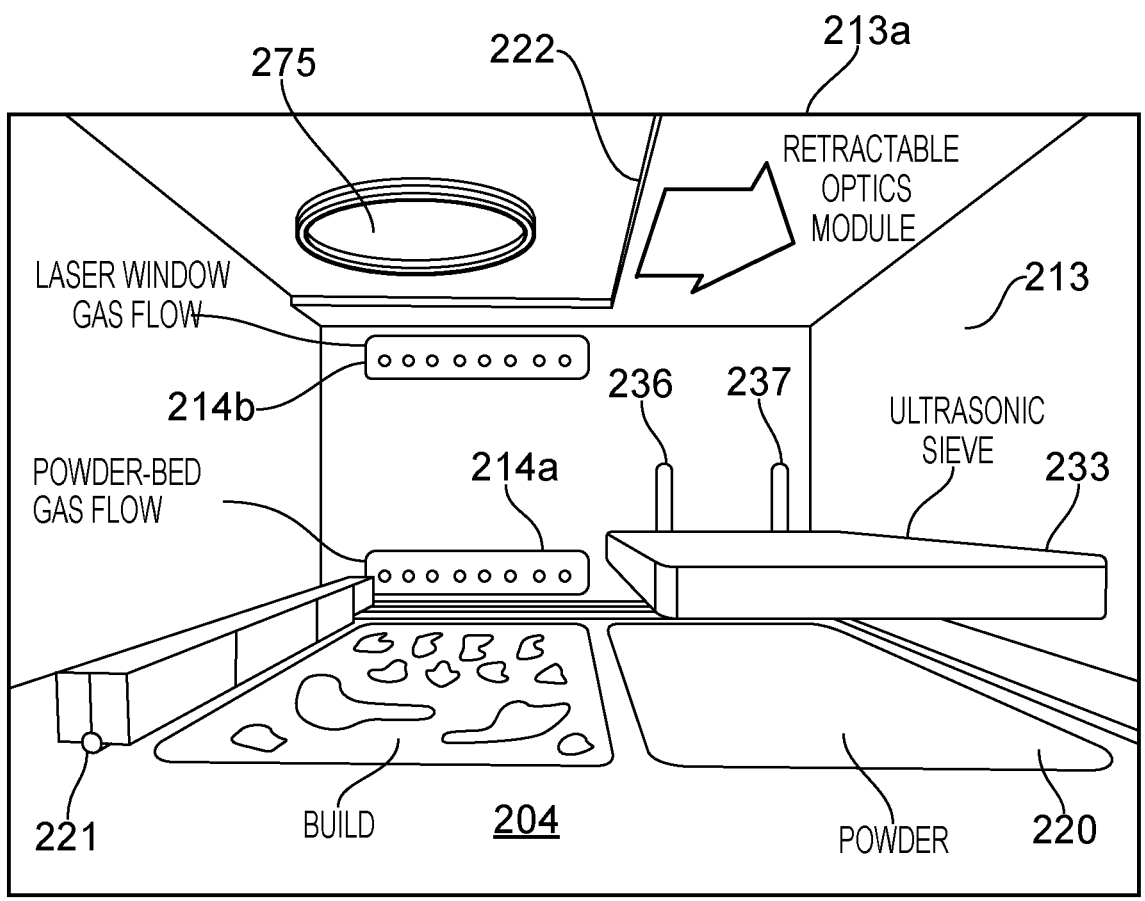
FIG. 8 is a perspective view within a lasing chamber of the powder bed fusion apparatus shown in FIG. 7.
Figure 9:
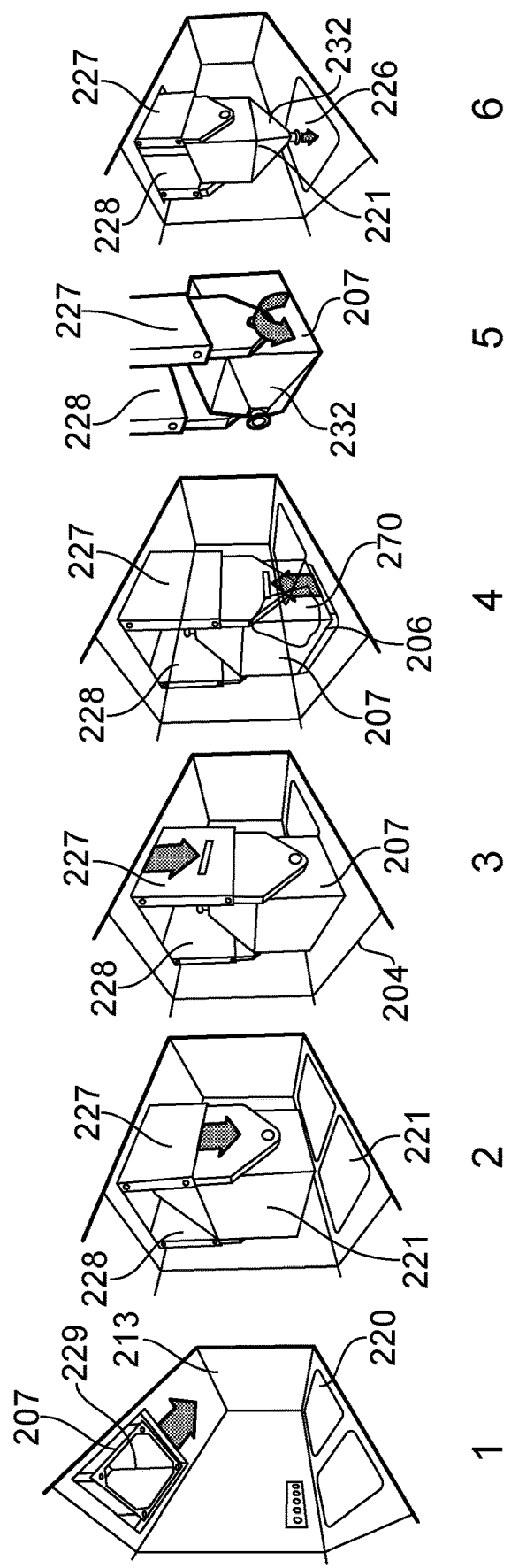
FIG. 9 shows the method of freeing unsolidified powder from the object using a receptacle of the mechanical manipulator of the apparatus according to the second embodiment of the invention.

In an unloading position of the manipulator 205 shown in FIG. 7, the arms 227, 228 can lower the build substrate 206 and object attached thereto to the storage area 224. The clean storage area 224 is accessible via a door 242. A detachable filter assembly 231 for filtering condensate and other particles from recirculated gas, for example, as is described in WO2010/026396, is also accessible through door 242 such that the filter assembly can be detached for replacement of the filter element. FIG. 8 illustrates gas flow inlets 214 and 215 in the build chamber.

Figure 10:
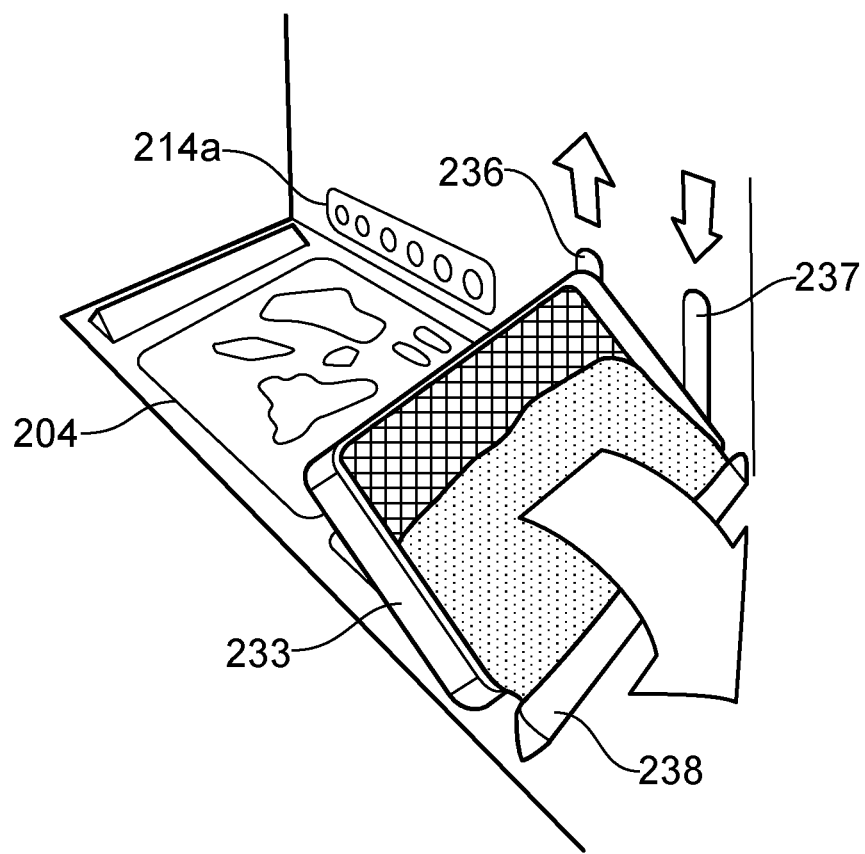
FIG. 10 is a perspective view of the powder bed fusion apparatus of FIG. 7 showing tilting of the sieve for disposal of oversized material.

A movable sieve 233 is provided in the build chamber above the doser 220. The sieve 233 is movable from a storage position spaced above the working plane such that the wiper 221 can move below the sieve 233 to spread powder dosed by the doser 220 across the powder bed to a sieving position in which the sieve 233 is received in the dosing sleeve 220b. In this position, freed powder pushed back into the dosing sleeve 233 passes through the sieve 233 such that large particulates are trapped by the sieve 233. The sieve 233 is supported by two arms 234 and 235 movable in slots 236, 237. Simultaneous raising and lowering of the arms 234, 235 raises and lowers the sieve 233, whereas, as shown in FIG. 10, raising of one of the arms 236 simultaneously with lowering of the other arm 237 tips the sieve 233 such that trapped particulates are dispensed into an oversize particle disposal channel 238.

In use, during the building of an object 270, the optical module 223 is positioned above the aperture 222, as shown in FIGS. 7 and 8. The optical module 223 directs a laser beam to selected locations in the working plane through window 275. At the end of the build, the optical module 223 is retracted and the mechanical manipulator 205 is positioned above the aperture 222.

The mechanical manipulator 205 is then controlled to lower the receptacle 207 into the build chamber and engage working surface 204. During this operation, the powder and object remain within the build volume. Once the receptacle 207 has been lowered in place, the build platform 202 is raised to push the unsolidified powder and object into the receptacle 207. The walls of the receptacle 207 confine the powder to the enclosed volume. The build platform 202 is raised until the flange on the build substrate 206 engages with the coupling members on the receptacle 207. The receptacle 207, which contains the object and to which the build substrate 206 is attached, is rotated above the working plane to free powder from the object and to direct the opening 226 downwards such that unsolidified/freed powder is dispensed from the receptacle back into the build volume. Before and/or during rotation of the receptacle 207, the build platform 202 is lowered such that freed powder can be collected within the build volume.

The mechanical manipulator may also comprise a vibrating mechanism, such as an ultrasonic vibrator for vibrating the receptacle 207 during rotation to facilitate the movement of powder to the opening 226.

A controller for controlling the apparatus may be pre-programmed to move the receptacle 207 through a sequence of movements (rotations and linear movements) based upon the internal geometry of the object. For example, a particular sequence of movements may aid the freeing of powder from internal passageways and may be determined based upon the geometry of those internal passageways.

After the operation to recover powder into the build volume, the receptacle 207 is lifted out through aperture 222 and moved to the position shown in FIG. 7.

To recover the powder dispensed into the build volume back into the doser 220, the sieve 233 is lowered into the doser sleeve 220b. The build platform 202 is then raised and the wiper 221 actuated to push powder raised above the working plane on-top of the sieve 233. Particles of the powder that are not oversize fall into the doser sleeve 220b whereas oversize particles are captured by the sieve 233. As shown in FIG. 10, at suitable times, the sieve 233 can be titled to dispense the over-size particles collected thereon into the oversize powder channel 238. The oversize particles are collected in oversize particle collection hopper 239 for removal by a user.

The mechanical manipulator 205 lowers the finished object which is attached to the build substrate 206 to the clean storage area 225 for removal by a user and picks up a new build substrate 206'. The mechanical manipulator 205 is then operated to transfer the new build substrate 206' to the build platform 202 for a subsequent build. The new build substrate 206' is stored in a suitable location in order that it can be picked up by the mechanical manipulator 205 once the object and associated build substrate have been dropped off in the storage area 225.

Top-ups to the powder in the doser 220 can be made through powder inlet 240. In FIG. 7, a powder canister 241 is shown attached to the powder inlet 240.

Figure 11:
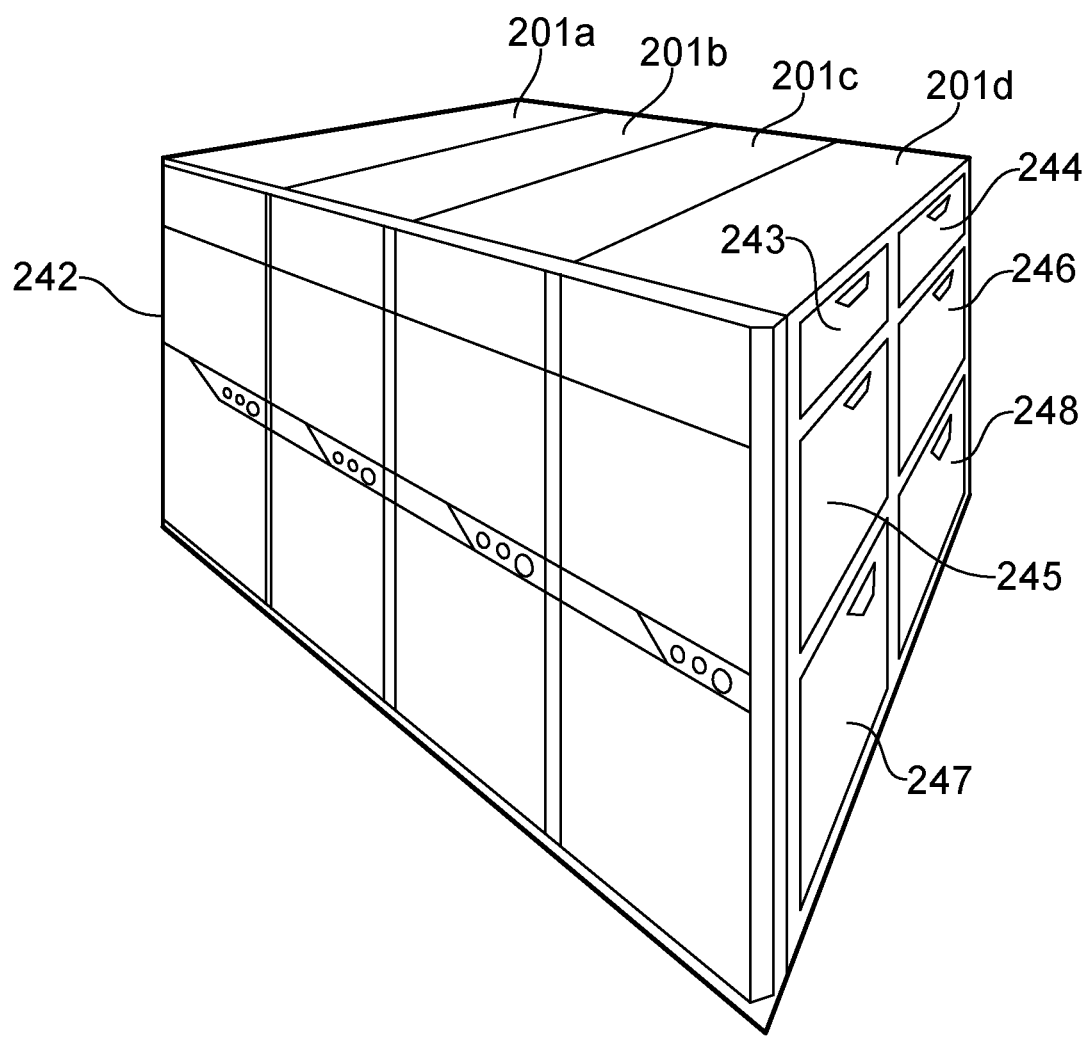
FIG. 11 is a perspective view of a plurality of powder bed fusion apparatus according to the second embodiment of the invention, stacked side-by-side.

Referring to FIG. 11, as routine servicing operations, such as removal of finished objects, removal and replacement of the filter assembly 231, access to the powder inlet 240 and removal of the oversize powder hopper 239, can be carried out through access doors located at opposed ends of the apparatus, a plurality of the apparatus may be stacked together side-by-side in a row. This helps to reduce the floor space occupied by the plurality of apparatus compared to current machines, which prevent such stacking of the apparatus at least due to access requirements. Each machine may be mounted on floor rails such that on occasions when access to the build chamber is required, for example during a material change or for servicing, the machine can be pulled out from the row of apparatus into a central corridor for cleaning. Side access doors 243 to 248 are provided for these occasional operations.

Figure 12:
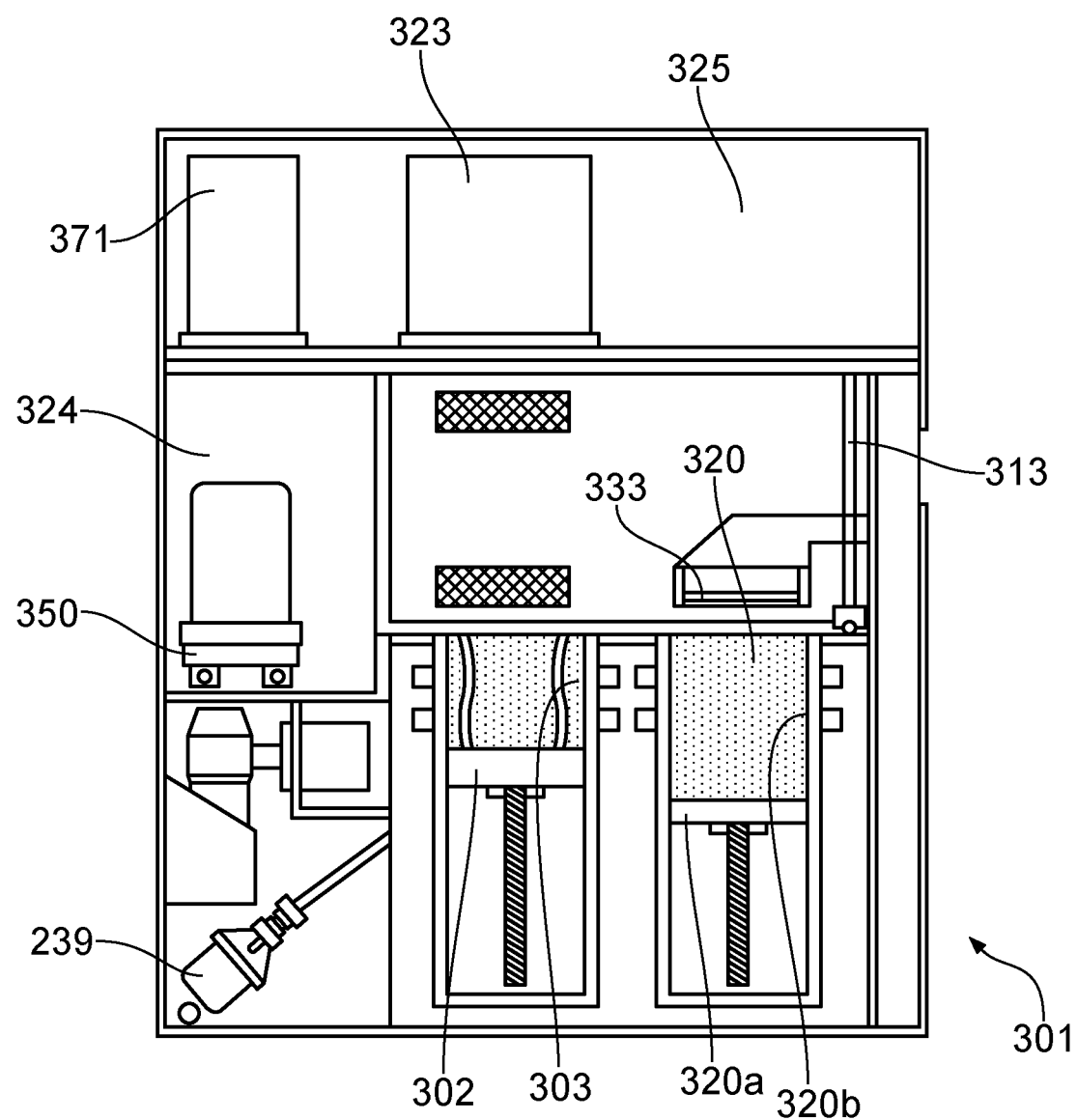
FIG. 12 is a schematic view of a powder bed fusion apparatus according to a third embodiment of the invention.
Figure 13:
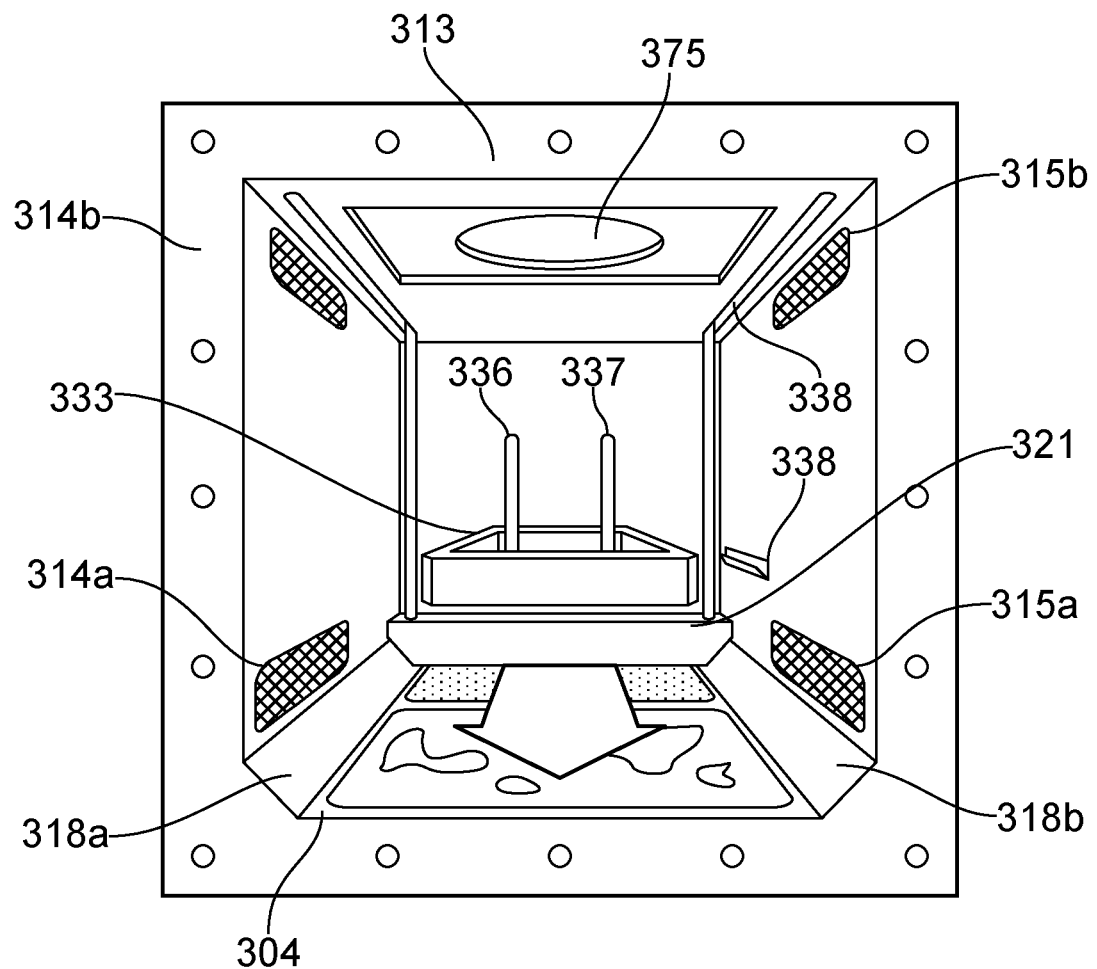
FIG. 13 a perspective view within a lasing chamber of the powder bed fusion apparatus shown in FIG. 12.
Figure 14A:
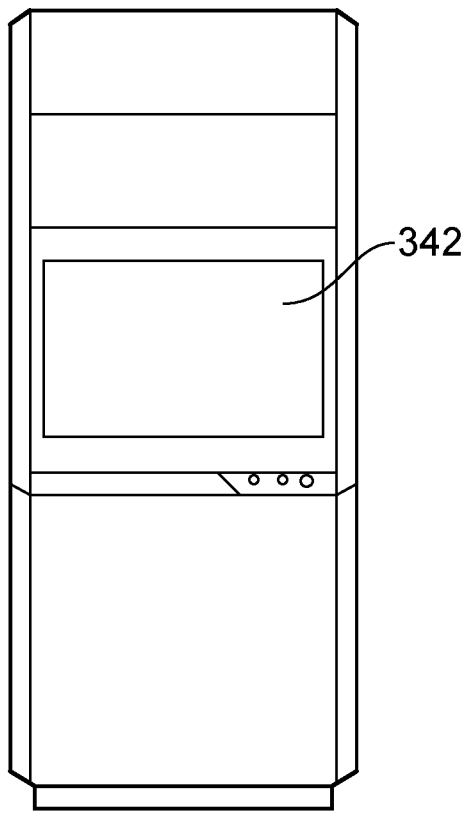
FIGS. 14a to 14c are side views and a perspective view of an end of the powder bed fusion apparatus in which an object built using the apparatus is stored for collection by an operator.
Figure 14B:
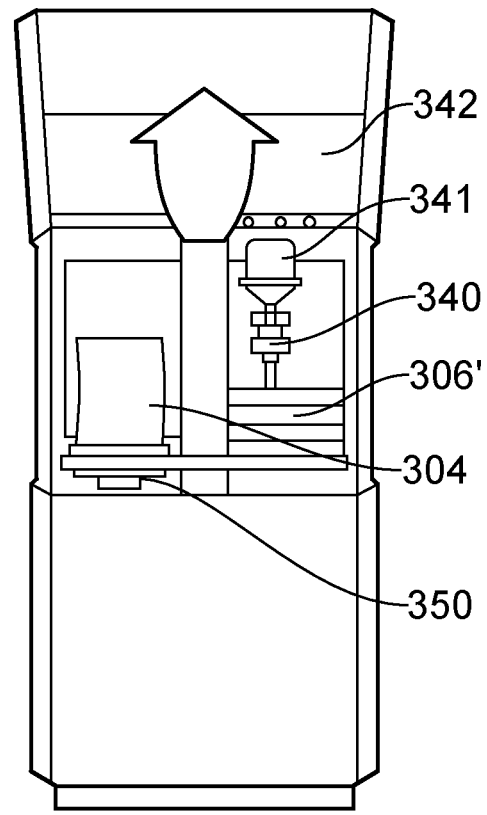
Figure 14C:
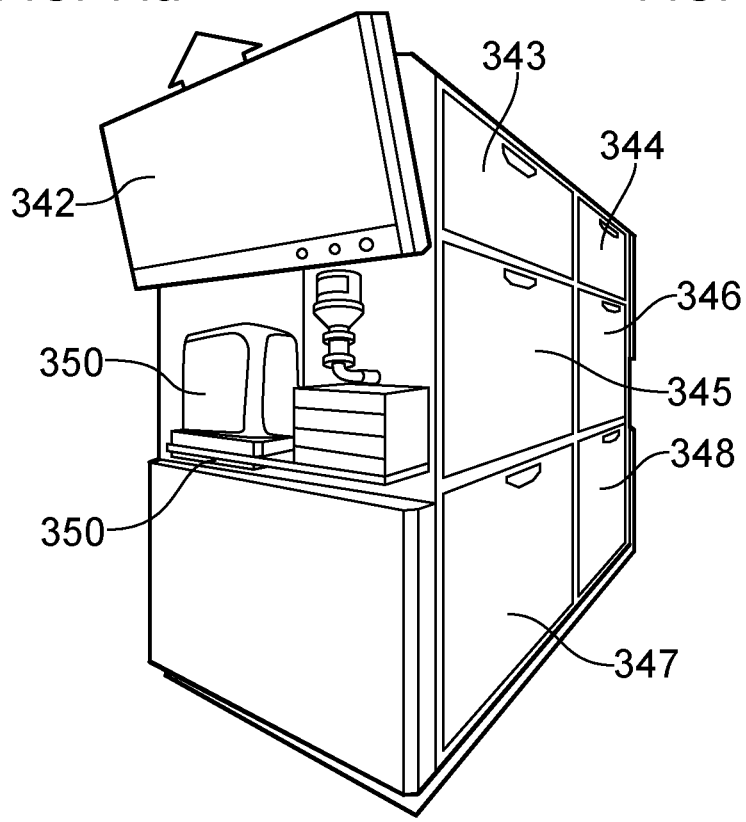

FIGS. 12 through 14 show a powder bed fusion apparatus according to another embodiment of the invention. Features of this embodiment that are the same or similar to features of the embodiment described with reference to FIGS. 7 to 11 have been given the same reference numerals but in the series 300.

This embodiment differs from the previous embodiment in that the oversize powder hopper 339 and powder inlet 340 are provided at the same end of the apparatus as the object clean storage area 324 and the filter assembly 331. Accordingly, access to only one end of the apparatus is required for the routine servicing operations.

The sieve 333 is mounted on arms that move in slots 336, 337 in an end wall of the build chamber 313 rather than a side wall. The wiper 321 is mounted on rails located above the build chamber 313.

The object clean storage area 324 comprises a support, in this embodiment in the form of support platform 350, for supporting the completed object and the build substrate 306. The support platform 350 is mounted on a linear axis such that support platform 350 can be moved to a receiving position for receiving the object and associated build substrate 306 from the mechanical manipulator 305 and a build substrate pick-up position, in which the mechanical manipulator can pick up a replacement build substrate 306' from the support platform 350. Movement of the support platform is driven by motor 351.

With the apparatus according to this embodiment only requiring access from one end during routine operations, a plurality of such apparatus can be stacked side-by-side and back-to-back.

Figure 15:
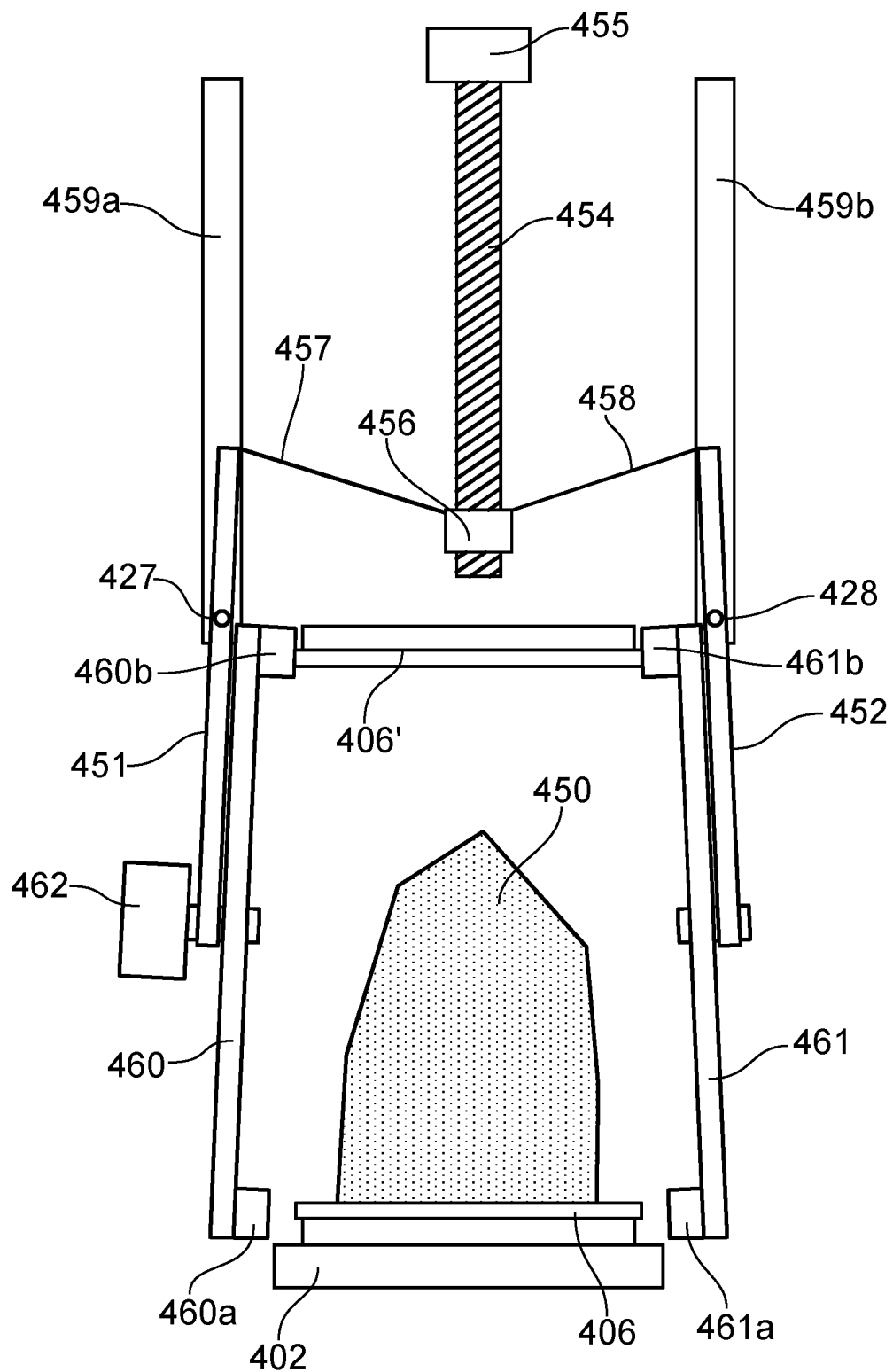
FIGS. 15 to 17 show a mechanical manipulator according to another embodiment of the invention in three different conditions.
Figure 16:
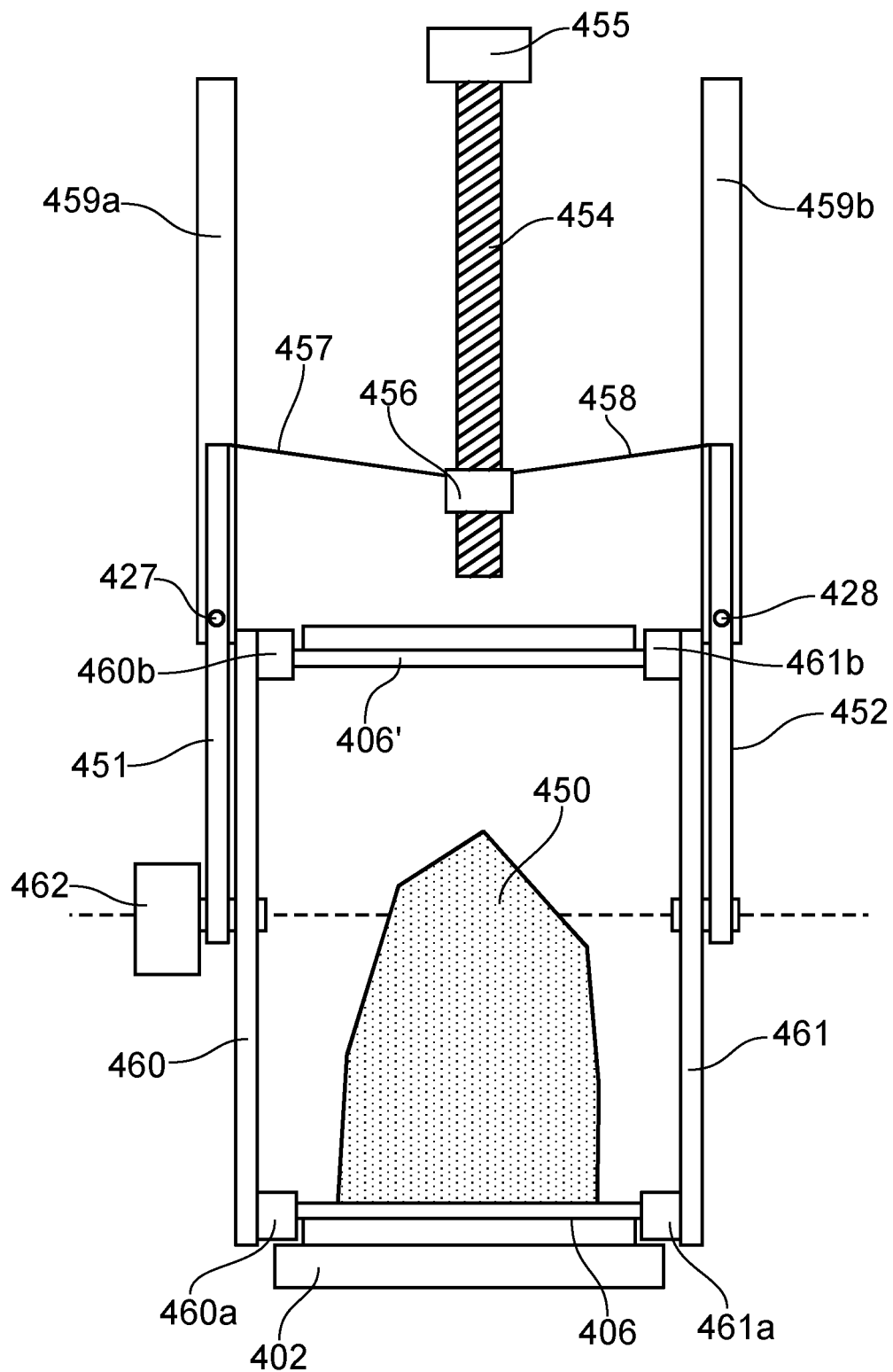
Figure 17:
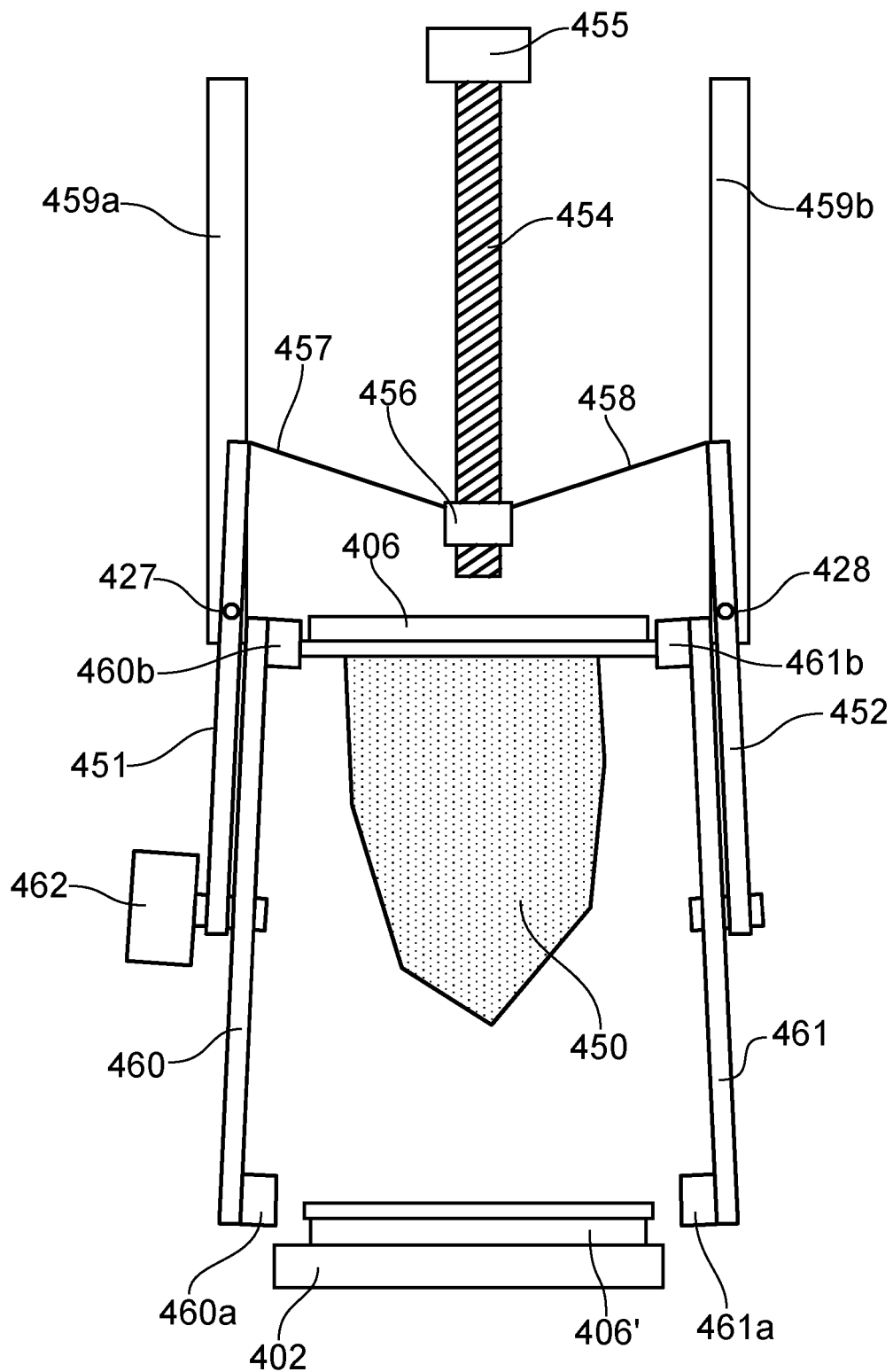
Figure 18:
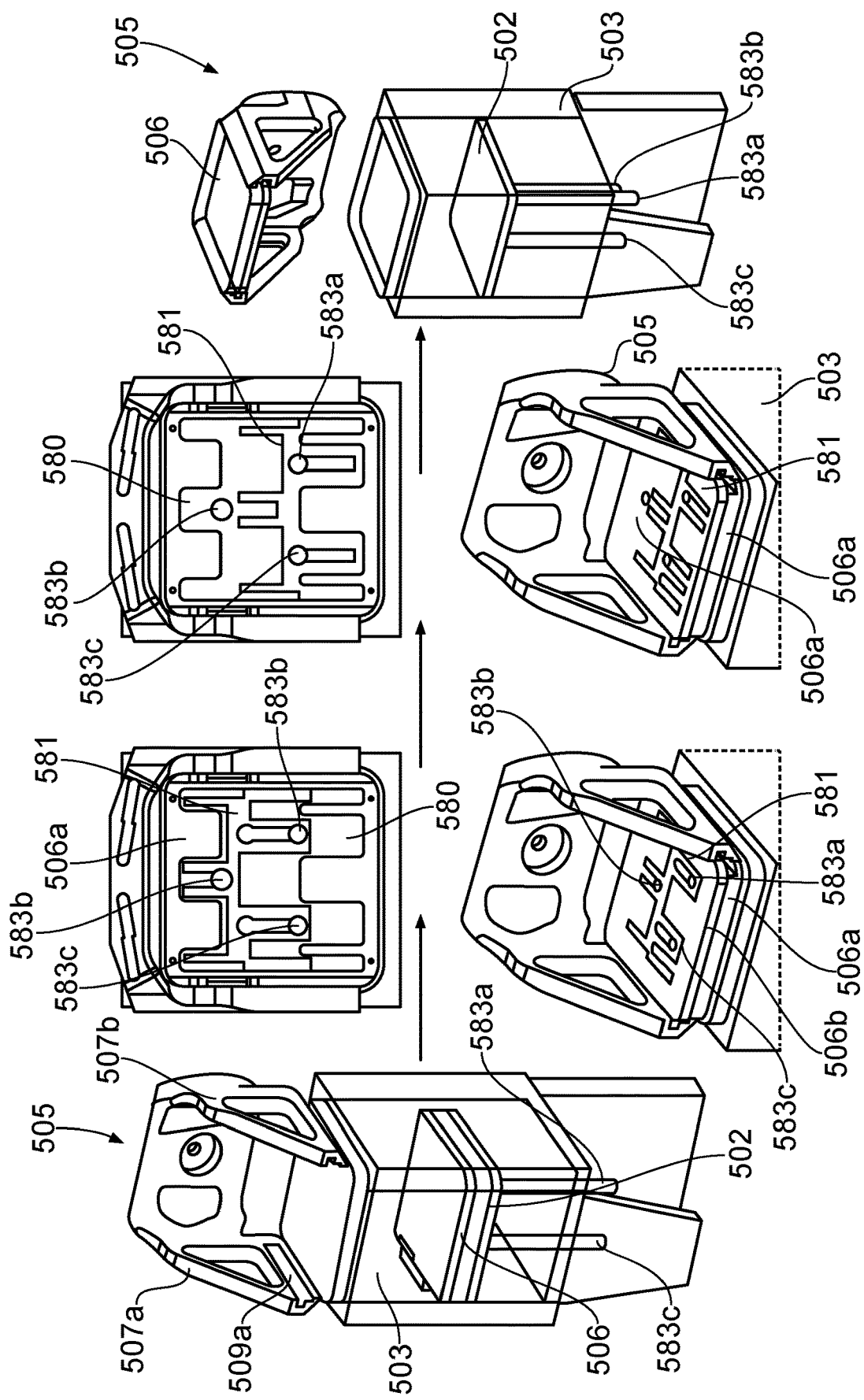
FIG. 18 shows a powder bed fusion apparatus according to another embodiment of the invention.
Figure 19D:
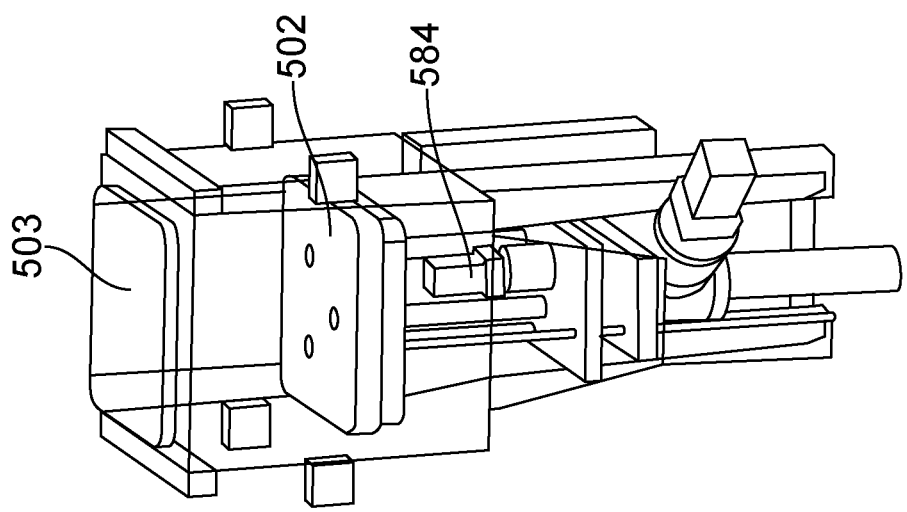
FIG. 19d is a perspective view of the build piston with the build platform in a lowered position and the connecting pins in a lowered position.
Figure 19C:
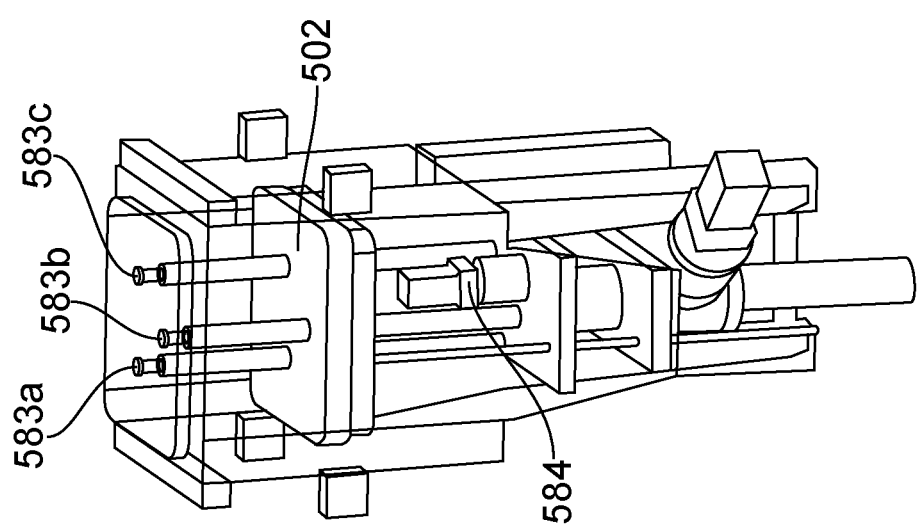
FIG. 19c is a perspective view of the build piston with the build platform in a lowered position and the connecting pins in a raised position.
Figure 19A:
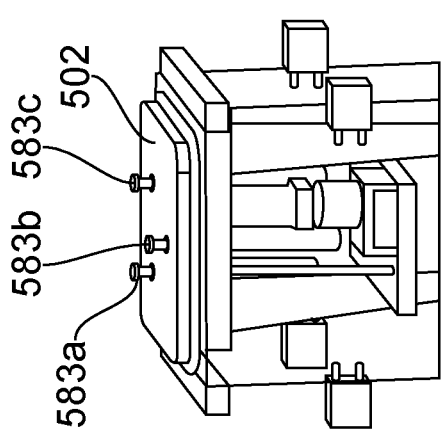
FIG. 19a is a perspective view of a top portion of a build piston of the powder bed fusion apparatus shown in FIG. 18.
Figure 19B:
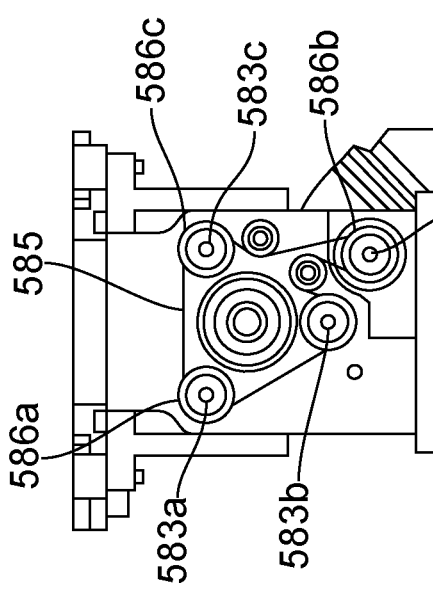
FIG. 19b is a sectional view through the build piston showing the drive mechanism for raising and lowering connecting pins.

FIGS. 15 to 17 shows a mechanical manipulator 405 according to another embodiment of the invention. Features of this embodiment that are the same or similar to features of the above described embodiments have been given the same reference numerals but in the series 400.

The mechanical manipulator 405 may be used in apparatus, such as described with reference to FIGS. 7 to 14. In this embodiment, the mechanical manipulator 405 can simultaneously hold both the object 450 and the substrate 406 to which it is attached and a replacement substrate 406' to be used for a subsequent build. Rotation of arms 407a, 407b of the mechanical manipulator frees powder from the object and allow build substrate 406' to be located on the build platform 402 for a subsequent build.

The mechanical manipulator 406 comprises cantilevered arms 427, 428 movable along guide rails 459a, 459b. Linkages in the form of levers 451, 452 are mounted on the cantilevered arms 427, 428 to be rotatable about a corresponding axis. One end of each lever 451, 452 is connected to a threaded follower 456 by linkages 457, 458. Each linkage 457, 458 is pivotable about joints to the corresponding lever 451, 452 and the follower 456. The follower 456 is threaded on a screw-thread 454, wherein rotation of the screw thread driven by motor 455 drives the follower 456 along the screw-thread 454.

Connected to the other end of the levers 451, 452 is an end effector in the form of two gripper fingers 460, 461. Each gripper finger 460, 461 is rotatably mounted on the corresponding lever 451, 452 and rotation of the gripper is driven by gripper motor 462. Each gripper finger 460, 461 comprises a first coupling members 460a, 461a for engaging with a first build substrate 406 and a second coupling members 460b, 461b for engaging with a second, replacement build substrate 406'.

In use, on completion of a build, the build platform is operated to raise the object and build substrate 406 to the top of the build sleeve. The mechanical manipulator is moved in place above the aperture in the ceiling of the build chamber. Held within coupling members 460b and 461b of the gripper is a replacement build substrate 406'. The replacement build substrate 406' is held in the top, inverted position shown in FIG. 15. Motor 455 is operated to rotate the screw thread 454 moving follower 456 downwards. This first pulls linkages 457, 458 to the position shown in FIG. 15. The angle of the linkages 457, 458 pulls the top ends of the levers 451, 452 together pulling coupling members 460a, 461a apart whilst coupling members 460b, 461b retain a grip on the replacement build substrate 406'. Further movement of the follower 456 pulls moves the cantilevered arms 427 along the guide rails 459a, 459b.

The gripper is lowered to locate the coupling members 460a, 461a either side of the build substrate 406 on which the object has been built. The drive from motor 455 is then reversed driving the follower 456 up the screw thread 454 straightening linkages 457 and 458 to push the coupling members 460a, 461a together to grip the build substrate 406, as shown in FIG. 16. Gripper motor 462 is then driven to rotate the gripper and locate the replacement build substrate 406' adjacent the build platform whilst simultaneously inverting the build substrate 406 and the object to free powder still attached thereto. The follower 456 can then be driven down again to open the coupling members 460b, 461b to release the replacement build substrate on to the build platform 402, as shown in FIG. 17. The follower 456 is then driven upwards to lift the mechanical manipulator together with the object out of the build chamber, and the object can be carried to and deposited in a storage location as described above with reference to FIGS. 7 to 14. During the depositing of the object in the storage location, a further replacement build substrate may be picked up.

A further embodiment of the invention is shown in FIGS. 18 to 21. Features of this embodiment that are the same or similar to features of the above described embodiments have been given the same reference numerals but in the series 500. This embodiment is similar to the embodiment described with reference to FIGS. 1 to 6 with a door 511a mounted mechanical manipulator 505.

This embodiment differs from the embodiment described with reference to FIGS. 1 to 6 in that the build substrate 506 is secured to the build platform 502 during the build and a mechanism is provided for releasing the build substrate 506 from the build platform 502 for tilting of the builds substrate 506 and object with the mechanical manipulator 505.

The mechanical manipulator 505 comprises arms 507a, 507b having a channel therein for engaging with a flange on the build substrate 506. An actuating mechanism is movable within each channel for engaging with a locking member of the build substrate 506. In the embodiment, the actuating mechanism is activated by cable ties that extend outside of the build chamber 513 such that the actuating mechanism can be operated by a drive located externally to the build chamber. However, in another embodiment, the actuating mechanism may be driven by a drive located within the build chamber, such as an electromagnet.

The build substrate 506 comprises an internal channel 580 in which a locking member 581 is movably located. In this embodiment, the build plate 506 is formed from a lower plate 506a having the recess cut therein for the forming the internal channel 580, locking member 581 and an upper plate 506b. The lower plate has three holes therein for receiving lugs of connecting pins 583a, 583b, 583c. The locking member 581 is movable within the channel from a position in which it engages the lugs to a position disengaged from the lugs under the control of the actuating mechanism located on the mechanical manipulator 505.

As best shown in FIGS. 19a to 19d, the build piston comprises connecting pins 583a, 583b, 583c that move with the build platform 502 but can also be driven to extend from the build platform 502. As most clearly shown in FIG. 19b, the movement of the connecting pins 583a, 583b, 583c relative to the build platform 502 is driven by a belt drive mechanism located below the build platform 502. A motor 584 drives a belt 585 around a loop to turn threaded members 586a, 586b, 586c. The treaded members 586a, 586b, 586c engage complimentary threads on connecting pins 583a, 583b, 583c to move the connecting pins 583a, 583b, 583c relative to the build platform 502.

Figure 20:
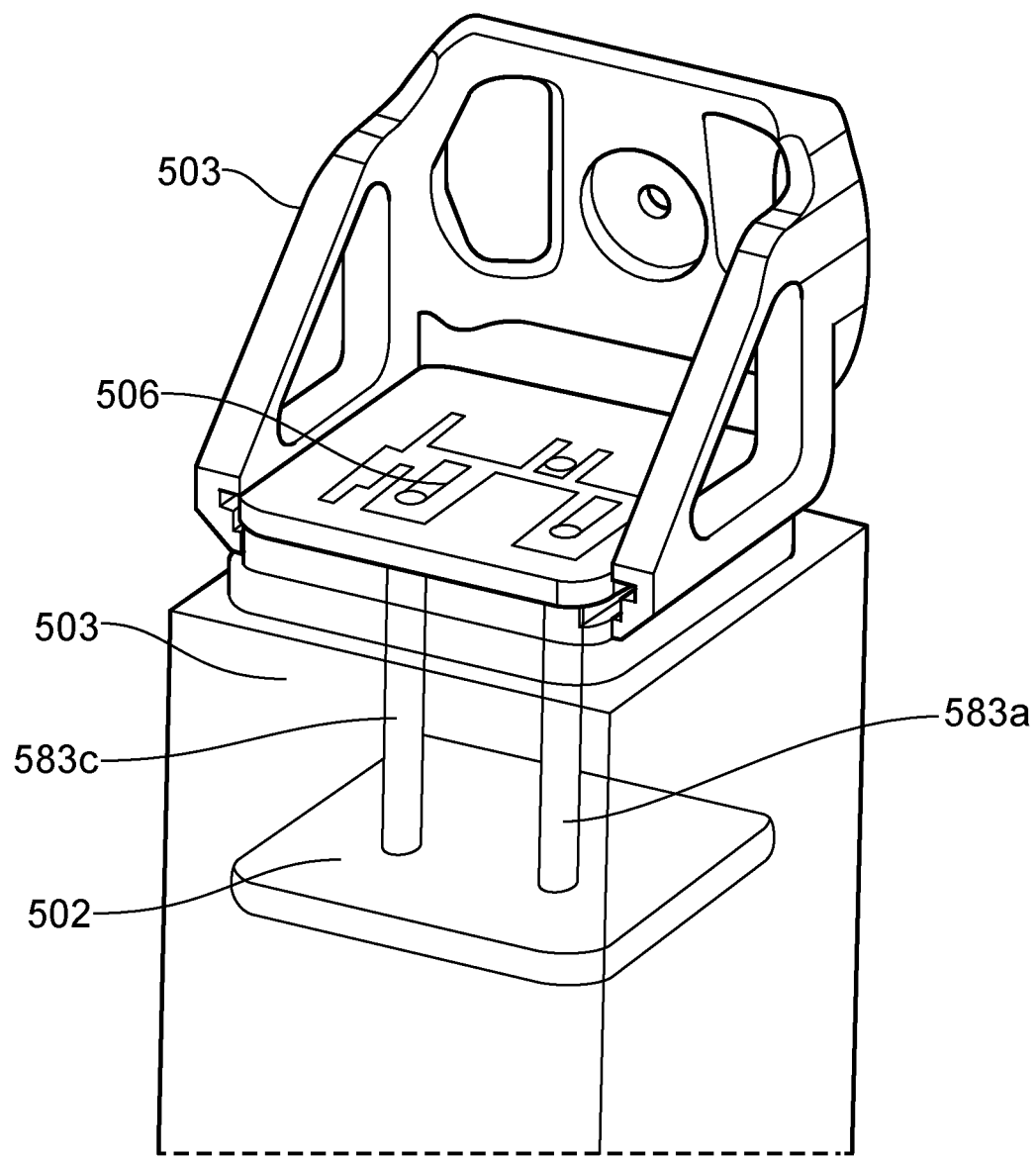
FIG. 20 is a perspective view of a top portion of a build piston with the build platform in a lowered position and the connecting pins in a raised position and connected to the build substrate.

In use, the build substrate is attached to the connecting pins 583a, 583b, 583c and, during the build, the build platform 502 is lowered together with the connecting pins 583a, 583b, 583c to allow the object to be formed layer-by-layer. However, unlike the embodiment described with reference to FIGS. 1 to 7, at the end of the build, the build platform 502 remains at a lower position in the build sleeve 503, as shown in FIG. 20, whilst the pins are driven to move the build substrate upwards to the top of the build sleeve 503. During this transition, powder will fall through the gap between the build substrate 506 and the build sleeve 503 into the build volume. By the time the build substrate 506 has been raised to the top of the build piston, the majority of the unsolidified powder surrounding the object will have fallen back into the build volume. Accordingly, when the flanges on the build substrate 506 engage with the mechanical manipulator 505, in the position shown in FIG. 20, these regions are substantially free of powder which could inhibit the connection of the build substrate 505 to the mechanical manipulator 505.

The actuating mechanism is then driven to decouple the build substrate 506 from the connecting pins 583a, 583b, 583c and the mechanical manipulator 505 rotated to tilt the object, freeing powder that was captured within the object. This embodiment may reduce an amount of powder that is deposited outside of the build volume reducing the weight of powder to be moved by the wiper to the overflow channels in an initial powder clearance stroke. The amount of powder to be pushed by the wiper into the overflow channels on subsequent powder clearance strokes can be controlled by an amount the build platform is raised between strokes.

Figure 21:
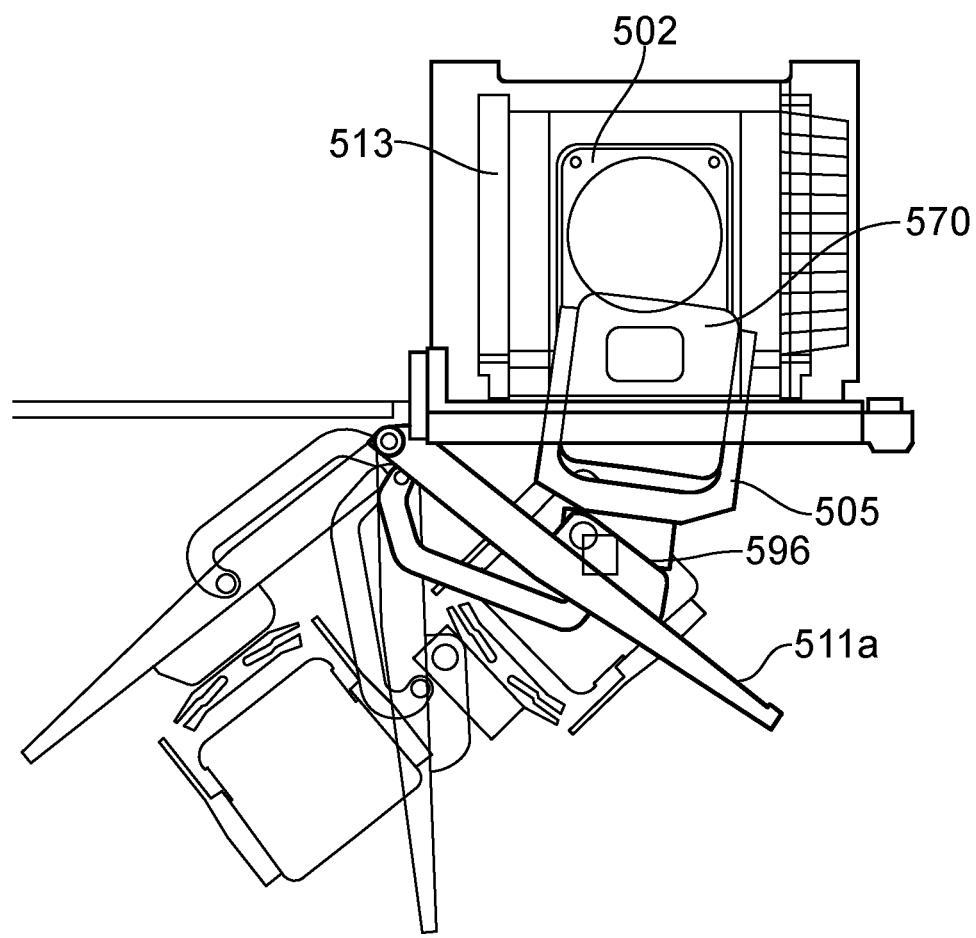
FIG. 21 is a top view of the powder bed fusion apparatus of FIG. 18 illustrating various stages of opening the door.

FIG. 21 shows a pivot mechanism 590 for attaching the mechanical manipulator 505 to the door 511a. The pivot mechanism 590 allows the mechanical manipulator to pivot about in an axis in a direction opposite to a direction the door 511a pivots about its axis such that the mechanical manipulator 505 can be moved from the build chamber 513 without contacting a wall of the build chamber 513.

It will be understood that alterations and modifications may be made to the above described embodiments without departing from the invention as defined herein. For example, rather than a dosing piston the doser may be a "top" doser which doses powder from above onto the surface 104, 204, 304. Powder may be transferred to the top doser from above and rather than depositing the freed powder back into the build volume, the receptacle may be moved to a location in which the freed powder can be recovered to a hopper of the top doser. This inlet may be accessible from the storage area allowing the user to top up powder into the top doser and for servicing of a sieve that filters the recovered powder as it is reintroduced into the top doser from the receptacle. Use of a top doser may allow the apparatus to have a smaller footprint and overcome a problem with dosing pistons in that a volume of the dosing piston has to be greater than the build volume due to packing of the powder and/or shrinkage of the solidified material during the build.

The receptacle may also be used during a material changeover. In particular, during a material change, the powder may be pushed into the build volume on top of the build substrate using the wiper. The receptacle may be then lowered in place and the powder pushed into the receptacle by raising the build substrate, as described above, until the build substrate engages the coupling members on the receptacle. Rather than rotating the receptacle, the receptacle could then be lifted from the build chamber thus extracting the powder. A replacement receptacle containing the replacement powder could then be carried to the build chamber by the mechanical manipulator and the replacement powder deposited in the build volume. Rather than using the same receptacle for material change, a receptacle having a closed top may be used to ensure that the powder is not exposed to oxygen when the powder is removed from the inert atmosphere in the build chamber. Alternatively, a system may be provided to cap the narrow opening in the receptacle. Furthermore, the powder may be removed from the build chamber together with the object rather than in separate operations.

In an alternative embodiment, the mechanical manipulator of any of the above described embodiments is transferrable between a plurality of powder bed fusion apparatus such that it can be used in the break-out of objects from the powder in each machine. In the case of the embodiments described with reference to FIGS. 7 to 14, it may be the case that the entire mechanical manipulator is transferrable, for example the actuating/handling mechanism and the receptacle 207, 307, or only the actuating/handling mechanism may be transferrable with the receptacles 207, 307 being left in the machine to which they are dedicated. Not transferring the receptacle may help to prevent cross-contamination of powder between machines.

In a further embodiment, the mechanical manipulator may be provided in a break-out module separate from the powder bed fusion. The build sleeve 103 and build platform 102 may form together a container that is removably mounted in the powder bed fusion apparatus. The breakout module comprises a space for receiving the removable container of a powder bed fusion apparatus such that raising of the build platform 102 to the top of the build sleeve 103 causes the build substrate 106 mounted thereon to engage with the coupling members on the mechanical manipulator. The removable container may be removable together with the elevator mechanism for moving the build platform in the build sleeve or each of the powder bed fusion apparatus and the break-out module may have an elevator mechanism fixed therein which engages with the build platform to move the build platform.

Rotation of the frame of the mechanical manipulator within the break-out station causes unsolidified powder to fall back into the container formed by the build sleeve and build platform. The build sleeve and build platform containing the freed powder may then be returned to the powder bed fusion apparatus for a subsequent build. In this way, if the object should remain in the powder for some time as it cools, this cooling process can take place in the break-out module, freeing up the powder bed fusion apparatus to carry out the next build.

Figure 22:
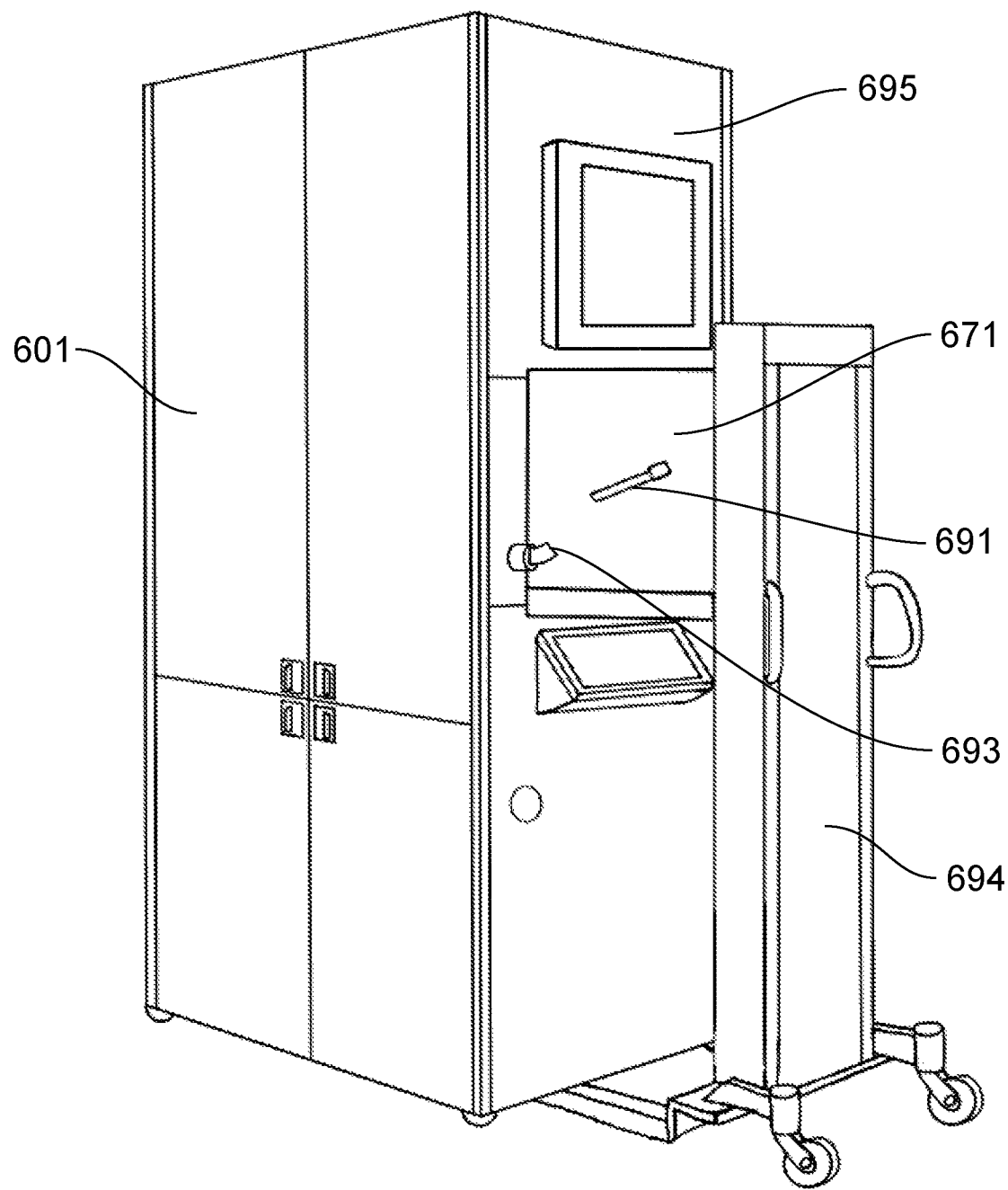
FIG. 22 is a perspective view of a transfer chamber according to another embodiment of the invention.

A further embodiment of the invention is shown in FIG. 22. Features of this embodiment that are the same or similar to features of the above described embodiments have been given the same reference numerals but in the series 600.

In this embodiment, the transfer chamber 671 is a separate module from the powder bed fusion apparatus and detachably mountable to the powder bed fusion apparatus 601. The transfer chamber 671 is mounted on a trolley and brought into mating contact with the powder bed fusion to form a seal around an opening in the build chamber through which the object is passed. A manually operated handle 691 may be provided, which, when operated, forces the transfer chamber 671 against the side of the powder bed fusion apparatus 601 to form the seal. A gas inlet 693 may be provided for connecting the transfer chamber 671 to an inert gas supply of the powder bed fusion apparatus 601. If an inert atmosphere is to be formed in the transfer chamber 671 then this is done before the door (not shown) to the transfer chamber 671 and the door 695 to the build chamber is opened. The formation of an inert atmosphere may be carried out to avoid the inert atmosphere in the build chamber being compromised and/or to allow cool down of the object within an inert atmosphere. However, it may be deemed acceptable to compromise and therefore, having to reform, the inert atmosphere in the build chamber between builds and the main purpose of the transfer chamber is for the removal and transfer of the object in a manner that reduces the release of powder into the surrounding environment.

To remove the object, the door to the transfer chamber 671 and the door 695 to be build chamber are opened and the object transferred into the transfer chamber 671 from the build chamber. The transfer device for transferring the object may comprise the mechanical device as described with reference to FIGS. 1 to 6, but mounted on a rear wall of the build chamber by a telescopic arm. The telescopic arm is driven to extend the mechanical manipulator holding the object into the transfer chamber 671. The object is then detached from the mechanical manipulator to leave the object within the transfer chamber 671 on retraction of the mechanical manipulator.

The trolley reduces the physical load on the operator when removing heavy/cumbersome parts and removes the need for the operator to be in close proximity to the build chamber.

The doors are then closed and the transfer chamber 671 can be wheeled on trolley 694 to another location for further processing of the object.

In a further embodiment, a transfer device is provided within the transfer chamber 671 for picking the object up from a mechanical manipulator within the powder bed fusion apparatus 601 and transferring the object into the transfer chamber 671.

The invention claimed is:

1. A powder bed fusion apparatus for building an object in a layer-by-layer manner, the powder bed fusion apparatus comprising a build platform movable within a build sleeve to define a build volume, a layer formation device for forming layers of powder across the build volume in a working plane, an irradiation device for irradiating powder in the working plane to selectively fuse the powder and a mechanical manipulator arranged to engage with the object and/or a build substrate, to which the object is attached, to tilt the object in a raised position above the working plane such that powder is freed from the object and deposited at a location above the working plane and/or into the build volume, wherein the mechanical manipulator comprises an end effector for engaging with the build substrate and/or object, the end effector positionable such that raising of the build platform causes the object and/or build substrate to be attached to the end effector, wherein subsequent movement of the end effector tilts the object.

2. A powder bed fusion apparatus according to claim 1, wherein the mechanical manipulator is arranged to engage with the build substrate supported on the build platform and on which the object is built and attached, the mechanical manipulator arranged to tilt the object by virtue of tilting the build substrate.

3. A powder bed fusion apparatus according to claim 1, wherein the mechanical manipulator is arranged to invert the object.

4. A powder bed fusion apparatus according to claim 1, wherein the mechanical manipulator is arranged to rotate the object about two axes.

5. A powder bed fusion apparatus according to claim 1, wherein the mechanical manipulator is mounted in the apparatus such that the build platform has to be lowered from an engagement position in which the mechanical manipulator engages with the object and/or build substrate to provide room for rotation of the mechanical manipulator engaged with the object and/or build substrate.

6. A powder bed fusion apparatus according to claim 1, comprising a build chamber for maintaining an inert atmosphere surrounding the object during the build, wherein the mechanical manipulator is arranged to tilt the object within the build chamber such that powder is freed from the object whilst under the inert atmosphere.

7. A powder bed fusion apparatus according to claim 6, wherein the mechanical manipulator comprises a drive mechanism that extends outside of the build chamber, wherein application of a force to the drive mechanism operates the mechanical manipulator.

8. A powder bed fusion apparatus according to claim 1, wherein the end effector comprises at least one movable arm positionable such that raising of the build platform causes the object and/or build substrate to be attached to the at least one arm, wherein subsequent movement of the at least one arm tilts the object.

9. A powder bed fusion apparatus according to claim 8, wherein the arm and build substrate comprise cooperating fastening elements that are engaged to attach the mechanical manipulator to the build substrate by raising of the build platform.

10. A powder bed fusion apparatus according to claim 9, wherein the cooperating fastening elements comprise a resilient element on one of the arms of the manipulator and the build substrate that is deflected by engagement of a flange on the other of the build substrate and the arm of the manipulator, when the build platform is raised, to cause the resilient element to grip the flange, thus attaching the mechanical manipulator to the build substrate.

11. A powder bed fusion apparatus according to claim 8, wherein the movable arm is mounted for rotation about an axis that is not orthogonal to the working plane.

12. A powder bed fusion apparatus according to claim 1, wherein the mechanical manipulator comprises a powder guide for guiding freed powder to a desired location when the object is tilted.

13. A powder bed fusion apparatus according to claim 12, wherein the powder guide comprises a chute or a funnel that is oriented when the mechanical manipulator tilts the object to guide the freed powder to the desired location.

14. A powder bed fusion apparatus according to claim 13, wherein the powder guide comprises a receptacle for housing the object, the chute or funnel forming part of the receptacle.

15. A powder bed fusion apparatus according to claim 14, wherein the receptacle confines the freed powder such that the freed powder is delivered to an outlet of the chute or funnel.

16. A powder bed fusion apparatus according to claim 14, wherein the receptacle comprises a first opening of the chute or funnel and a second opening arranged such that the object and build substrate can be pushed into the receptacle through second opening by the build platform.

17. A powder bed fusion apparatus according to claim 16, wherein the second opening is arranged to be closed by the build substrate when the build substrate is pushed into the receptacle by the build platform.

18. A powder bed fusion apparatus according to claim 13, wherein the chute or funnel is positionable when the object is titled by the mechanical manipulator to dispense freed powder into the build volume, into a powder overflow channel and/or into a doser.

19. A plurality of powder bed fusion apparatus, each of the powder bed fusion apparatus for building an object in a layer-by-layer manner and comprising a build platform movable within a build sleeve to define a build volume, a layer formation device for forming layers of powder across the build volume in a working plane and an irradiation device for irradiating powder in the working plane to selectively fuse the powder, the plurality of powder bed fusion apparatus further comprising a mechanical manipulator movable between the plurality of powder bed fusion apparatus such that, in each powder bed fusion apparatus, the mechanical manipulator is capable of engaging with the object and/or a build substrate, to which the object is attached, to tilt the object in a raised position above the working plane such that powder is freed from the object and deposited at a location above the working plane and/or into the build volume, wherein the mechanical manipulator comprises an end effector for engaging with the build substrate and/or object, the end effector positionable such that raising of the build platform causes the object and/or build substrate to be attached to the end effector, wherein subsequent movement of the end effector tilts the object.

20. A break-out device for the break-out of an object from unsolidified powder, the object built in a layer-by-layer manner in a powder bed fusion apparatus comprising a build platform movable within a build sleeve to define a build volume, a layer formation device for forming layers of powder across the build volume in a working plane and an irradiation device for irradiating powder in the working plane to selectively fuse the powder, the build sleeve movable from a build position in which the powder is fused, the break-out device comprising a space for receiving the build sleeve moved from the build position and a mechanical manipulator comprising a frame having coupling members thereon for engaging with the object and/or a build substrate on which the object is built, the frame rotatable to tilt the object such that powder is freed from the object, the coupling members positioned or positionable such that raising of the build platform in the build sleeve with the object and/or build substrate mounted thereon, when the build sleeve is received in the space within the break-out module, causes the coupling members to engage the object and/or build substrate.

21. A break-out device according to claim 20, wherein the mechanical manipulator is mountable in or on the powder bed fusion apparatus.

22. A break-out device according to claim 20, wherein the mechanical manipulator is mounted in or on a break-out module separate from the powder bed fusion apparatus, wherein the space is for receiving a removable build sleeve of the powder bed fusion apparatus.

23. A break-out device according to claim 22, wherein rotation of the frame within the break-out station causes freed powder to fall back into the build sleeve.

* * * * *